United States Patent
Kong et al.

(10) Patent No.: US 11,889,547 B2
(45) Date of Patent: Jan. 30, 2024

(54) RANDOM ACCESS METHOD AND APPARATUS, DEVICE, AND STORAGE MEDIUM

(71) Applicant: Huawei Technologies Co., Ltd., Shenzhen (CN)

(72) Inventors: Chuili Kong, Hangzhou (CN); Gongzheng Zhang, Hangzhou (CN); Yunfei Qiao, Hangzhou (CN); Hejia Luo, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 442 days.

(21) Appl. No.: 17/244,487

(22) Filed: Apr. 29, 2021

(65) Prior Publication Data
US 2021/0250990 A1    Aug. 12, 2021

Related U.S. Application Data

(63) Continuation of application No. PCT/CN2019/109579, filed on Sep. 30, 2019.

(30) Foreign Application Priority Data

Oct. 31, 2018   (CN) .......................... 201811285504.7

(51) Int. Cl.
*H04W 74/00*  (2009.01)
*H04W 76/11*  (2018.01)
(Continued)

(52) U.S. Cl.
CPC ......... *H04W 74/008* (2013.01); *H04L 1/0061* (2013.01); *H04W 56/009* (2013.01);
(Continued)

(58) Field of Classification Search
CPC ......... H04W 56/0045; H04W 74/0833; H04W 72/0446; H04W 74/008; H04W 56/009;
(Continued)

(56) References Cited

U.S. PATENT DOCUMENTS 11,140,695 B1 * 10/2021 Eyuboglu ........... H04W 72/535
11,206,549 B1 * 12/2021 Eyuboglu ........... H04J 11/0079
(Continued)

FOREIGN PATENT DOCUMENTS

| CN | 101263671 A | 9/2008 |
| CN | 101897229 A | 11/2010 |

(Continued)

OTHER PUBLICATIONS

R1-1811329, Ericsson, On adapting random access procedures for NTN, 3GPP TSG-RAN WG1 Meeting #94bis, Chengdu, China, Oct. 8-12, 2018, 4 pages.

(Continued)

*Primary Examiner* — Allahyar Kasraian
(74) *Attorney, Agent, or Firm* — Conley Rose, P.C.

(57) ABSTRACT

A random access method includes sending a random access preamble to a base station on a first time domain resource, obtaining an index value of the first time domain resource, obtaining an index difference between the first time domain resource and a second time domain resource, obtaining an index value of the second time domain resource by adding the index value of the first time domain resource and the index difference, obtaining a random access radio network temporary identifier (RA-RNTI) based on the index value of the second time domain resource, receiving a random access response (RAR) from the base station, and descrambling a cyclic redundancy check (CRC) code of the RAR using the RA-RNTI.

20 Claims, 12 Drawing Sheets

(51) Int. Cl.
 *H04L 1/00* (2006.01)
 *H04W 56/00* (2009.01)
 *H04W 74/08* (2009.01)

(52) U.S. Cl.
 CPC ... *H04W 56/0045* (2013.01); *H04W 74/0833* (2013.01); *H04W 76/11* (2018.02)

(58) Field of Classification Search
 CPC ..... H04W 56/00; H04W 76/11; H04L 1/0061; H04L 5/0048
 See application file for complete search history.

(56) References Cited

U.S. PATENT DOCUMENTS

| | | | |
|---|---|---|---|
| 2009/0154429 A1* | 6/2009 | Vaidya | H04W 72/1263 370/336 |
| 2009/0316621 A1 | 12/2009 | Lane et al. | |
| 2017/0013643 A1* | 1/2017 | Nan | H04W 74/006 |
| 2017/0374689 A1 | 12/2017 | Liu et al. | |
| 2018/0092150 A1 | 3/2018 | Tenny et al. | |
| 2018/0098235 A1 | 4/2018 | Bagheri et al. | |
| 2018/0124822 A1 | 5/2018 | Wang et al. | |
| 2018/0184461 A1* | 6/2018 | Zhang | H04W 72/044 |
| 2018/0192436 A1 | 7/2018 | Yi et al. | |
| 2018/0220466 A1* | 8/2018 | Park | H04W 74/0833 |
| 2018/0234935 A1 | 8/2018 | Uchiyama | |
| 2018/0263053 A1 | 9/2018 | Moon | |
| 2019/0098667 A1 | 3/2019 | Lai et al. | |
| 2019/0260452 A1 | 8/2019 | Zhang et al. | |
| 2020/0021470 A1 | 1/2020 | Sun et al. | |
| 2020/0068597 A1* | 2/2020 | Ohara | H04W 72/1268 |
| 2020/0245361 A1 | 7/2020 | Xiong et al. | |
| 2020/0260495 A1* | 8/2020 | Kim | H04W 74/006 |

FOREIGN PATENT DOCUMENTS

| | | |
|---|---|---|
| CN | 102938931 A | 2/2013 |
| CN | 105992383 A | 10/2016 |
| CN | 107734514 A | 2/2018 |
| CN | 108260108 A | 7/2018 |
| CN | 108352979 A | 7/2018 |
| CN | 108353430 A | 7/2018 |
| CN | 108632179 A | 10/2018 |
| CN | 108633102 A | 10/2018 |
| CN | 108668361 A | 10/2018 |
| KR | 20170037505 A | 4/2017 |
| WO | 2018106067 A1 | 6/2018 |
| WO | 2018176038 A1 | 9/2018 |

OTHER PUBLICATIONS

R1-1806768, Nokia et al., Considerations on Timing Advance and Random Access for NTN, 3GPP TSG RAN WG1 Meeting #93, Busan, Korea, May 21-25, 2018, 4 pages.

3GPP TS 38.321 V15.3.0 3rd Generation Partnership Project; Technical Specification Group Radio Access Network; NR;Medium Access Control (MAC) protocol specification(Release 15), Sep. 2018, 76 pages.

Andres Laya et al., Efficient Contention Resolution in Highly Dense LTE Networks for Machine Type Communications, 2015 IEEE Global Communications Conference (GLOBECOM), Dec. 6-10, 2015, 7 pages.

CHEN Kun-shan et al., Random access method for GEO satellite communication system-oriented LTE, Journal of Terahertz Science and Electronic Information Technology, vol. 11, No. 5, Oct. 2013, 5 pages.

Nomor Resarch GMBH, et al., "Considerations on MAC Control Loops and Timings in Non-Terrestrial Networks (NTN)," 3GPP Draft; R2-1813615, Oct. 8-12, 2018, 6 pages.

* cited by examiner

RANDOM ACCESS METHOD AND APPARATUS, DEVICE, AND STORAGE MEDIUM

CROSS-REFERENCE TO RELATED APPLICATIONS

This application is a continuation of International Patent Application No. PCT/CN2019/109579 filed on Sep. 30, 2019, which claims priority to Chinese Patent Application No. 201811285504.7 filed on Oct. 31, 2018. The disclosures of the aforementioned applications are hereby incorporated by reference in their entireties.

TECHNICAL FIELD

This application relates to the field of wireless communications technologies, and in particular, to a random access method and apparatus, a device, and a storage medium.

BACKGROUND

In a wireless communications system, random access is a common processing mechanism. A user equipment (UE) may implement synchronization with a cell through random access, to obtain an uplink resource.

In a related technology, when performing random access, UE may send a random access preamble to a base station. In addition, the UE may obtain, through broadcast of the base station, an index value of the $1^{st}$ slot that is of a physical random access channel (PRACH) and that is used by the UE to send the random access preamble, and may calculate a random access radio network temporary identifier (RA-RNTI) by using the index value. After receiving the random access preamble sent by the UE, the base station may obtain an index value of the $1^{st}$ slot that is of a PRACH and that is used by the base station to receive the random access preamble, may calculate an RA-RNTI by using the obtained index value, and may scramble a cyclic redundancy check (CRC) code of a random access response (RAR) by using the calculated RA-RNTI. Then, the base station may send the scrambled RAR to the UE. After receiving the RAR, the UE may descramble the RAR by using the RA-RNTI calculated by the UE.

Generally, a round-trip delay (RTD) between UE and a base station in a wireless communications system is less than duration of a single slot. Therefore, the $1^{st}$ slot that is of a PRACH and that is used by the UE to send a random access preamble is the same as the $1^{st}$ slot that is of a PRACH and that is used by the base station to receive the random access preamble, and index values of the two slots are the same. Therefore, an RA-RNTI calculated by the base station is the same as an RA-RNTI calculated by the UE. Therefore, the UE can successfully descramble a RAR. However, when an RTD between the UE and the base station is greater than duration of a single slot, an RA-RNTI calculated by the base station is different from an RA-RNTI calculated by the UE. In this case, the UE cannot successfully descramble a RAR. Consequently, random access fails, affecting random access efficiency.

SUMMARY

This application provides a random access method and apparatus, a device, and a storage medium, to ensure random access efficiency. The technical solutions are as follows.

According to a first aspect, a random access method is provided. The random access method is used in a UE of a wireless communications system. The wireless communications system includes the UE and a base station. An RTD between the UE and the base station is greater than duration of a single slot. The method includes sending a random access preamble to the base station on a first time domain resource, and obtaining an index value of the first time domain resource, obtaining an index difference between the first time domain resource and a second time domain resource, where the index difference is determined based on the delay of data transmission between the UE and the base station, and the second time domain resource is a time domain resource used by the base station to receive the random access preamble sent by the UE, obtaining an index value of the second time domain resource by adding the index value of the first time domain resource and the index difference, obtaining an RA-RNTI based on the index value of the second time domain resource, and receiving a RAR sent by the base station, and descrambling a CRC code of the RAR by using the RA-RNTI.

Optionally, the first time domain resource is the $1^{st}$ slot that is of a PRACH and that is used by the UE to send the random access preamble to the base station, and obtaining an index value of the first time domain resource includes receiving broadcast information sent by the base station, where the broadcast information is used to indicate the index value of the first time domain resource.

Optionally, the second time domain resource is the $1^{st}$ slot that is of a PRACH and that is used by the base station to receive the random access preamble sent by the UE, and obtaining an index difference between the first time domain resource and a second time domain resource includes receiving a first offset value sent by the base station, where the first offset value is obtained by the base station by performing a rounding operation on a quotient obtained by dividing a minimum RTD by the duration of the single slot, the minimum RTD is obtained based on a shortest distance between the base station and a target cell, and the target cell is a cell in which the UE is located, and obtaining the index difference based on the first offset value.

Optionally, descrambling a CRC code of the RAR by using the RA-RNTI includes, when the rounding operation is a rounding-down operation, descrambling the CRC of the RAR by using a first RA-RNTI and a second RA-RNTI separately, where the first RA-RNTI is calculated based on an index value that is of the second time domain resource and that is obtained by adding a first index difference and the index value of the first time domain resource, and the second RA-RNTI is calculated based on an index value that is of the second time domain resource and that is obtained by adding a second index difference and the index value of the first time domain resource, where the first index difference is equal to the first offset value plus 1, and the second index difference is equal to the first offset value plus 2, or when the rounding operation is a rounding-up operation, descrambling the CRC of the RAR by using the first RA-RNTI and a third RA-RNTI separately, where the third RA-RNTI is calculated based on an index value that is of the second time domain resource and that is obtained by adding a third index difference and the index value of the first time domain resource, where the third index difference is equal to the first offset value.

Optionally, the RAR carries a processed timing advance (TA), and the method further includes, when the CRC of the RAR is successfully descrambled by using the first RA-RNTI or the third RA-RNTI, calculating, based on the processed TA by using a first formula, an unprocessed TA, where the first formula includes:

$TA=TA_{new}+p$, and when the CRC of the RAR is successfully descrambled by using the second RA-RNTI, calculating, based on the processed TA by using a second formula, an unprocessed TA, where the second formula includes:

$TA=TA_{new}+p+1$, where TA is the unprocessed TA, $TA_{new}$ is the processed TA, and p is the first offset value.

Optionally, the second time domain resource is the $1^{st}$ slot that is of a PRACH and that is used by the base station to receive the random access preamble sent by the UE, and obtaining an index difference between the first time domain resource and a second time domain resource includes receiving indication information sent by the base station, where the indication information is used to indicate a rough RTD between the base station and the UE, obtaining a second offset value by performing a rounding-up operation on a quotient obtained by dividing the rough RTD by the duration of the single slot, and obtaining the index difference based on the second offset value.

Optionally, descrambling a CRC code of the RAR by using the RA-RNTI includes descrambling the CRC of the RAR by using a fourth RA-RNTI, a fifth RA-RNTI, and a sixth RA-RNTI separately, where the fourth RA-RNTI is calculated based on an index value that is of the second time domain resource and that is obtained by adding a fourth index difference and the index value of the first time domain resource, the fifth RA-RNTI is calculated based on an index value that is of the second time domain resource and that is obtained by adding a fifth index difference and the index value of the first time domain resource, and the sixth RA-RNTI is calculated based on an index value that is of the second time domain resource and that is obtained by adding a sixth index difference and the index value of the first time domain resource, where the fourth index difference is equal to the second offset value minus 1, the fifth index difference is equal to the second offset value, and the sixth index difference is equal to the second offset value plus 1.

Optionally, the RAR carries a processed TA, and the method further includes, when the CRC of the RAR is successfully descrambled by using the fourth RA-RNTI, the fifth RA-RNTI, or the sixth RA-RNTI, calculating, based on the processed TA by using a third formula, an unprocessed TA, where the third formula includes:

$TA=TA_{new}+RTD_{rough}$, where TA is the unprocessed TA, $TA_{new}$ is the processed TA, and $RTD_{rough}$ is the rough RTD.

Optionally, the base station is an artificial satellite.

According to a second aspect, a random access method is provided. The random access method is used in a base station of a wireless communications system. The wireless communications system includes UE and the base station. An RTD between the UE and the base station is greater than duration of a single slot. The method includes receiving, on a second time domain resource, a random access preamble sent by the UE, and obtaining an index value of the second time domain resource, obtaining an index difference between a first time domain resource and the second time domain resource, where the index difference is determined based on the delay of data transmission between the UE and the base station, and the first time domain resource is a time domain resource used by the UE to send the random access preamble to the base station, obtaining an index value of the first time domain resource by subtracting the index difference from the index value of the second time domain resource, obtaining a RA-RNTI based on the index value of the first time domain resource, and scrambling a CRC code of an access response RAR by using the RA-RNTI, and sending the scrambled RAR to the UE.

Optionally, the first time domain resource is the $1^{st}$ slot that is of a PRACH and that is used by the UE to send the random access preamble to the base station, and the second time domain resource is the $1^{st}$ slot that is of a PRACH and that is used by the base station to receive the random access preamble sent by the UE, and obtaining an index difference between a first time domain resource and the second time domain resource includes obtaining a TA, and obtaining the index difference by performing a rounding-up operation on a quotient obtained by dividing the TA by the duration of the single slot.

Optionally, the base station is an artificial satellite.

According to a third aspect, a random access method is provided. The random access method is used in UE of a wireless communications system. The wireless communications system includes the UE and a base station. An RTD between the UE and the base station is greater than duration of a single slot. The method includes sending a random access preamble to the base station on a first time domain resource, and obtaining an index value of the first time domain resource, where duration of the first time domain resource is greater than or equal to the RTD between the UE and the base station, obtaining a RA-RNTI based on the index value of the first time domain resource, and receiving a RAR sent by the base station, and descrambling a CRC code of the RAR by using the RA-RNTI, where the CRC of the RAR is scrambled by the base station by using an RA-RNTI obtained based on an index value of a second time domain resource, the second time domain resource is a time domain resource used by the base station to receive the random access preamble sent by the UE, and duration of the second time domain resource is greater than or equal to the RTD between the UE and the base station.

According to a fourth aspect, a random access method is provided. The random access method is used in a base station of a wireless communications system. The wireless communications system includes UE and the base station. An RTD between the UE and the base station is greater than duration of a single slot. The method includes receiving, on a second time domain resource, a random access preamble sent by the UE, and obtaining an index value of the second time domain resource, where duration of the second time domain resource is greater than or equal to the RTD between the UE and the base station, obtaining a RA-RNTI based on the index value of the second time domain resource, and scrambling a CRC code of a RAR by using the RA-RNTI, and sending the scrambled RAR to the UE, where the UE is configured to descramble the CRC of the RAR by using an RA-RNTI obtained based on an index value of the first time domain resource, the first time domain resource is a time domain resource used by the UE to send the random access preamble to the base station, and duration of the first time domain resource is greater than or equal to the RTD between the UE and the base station.

According to a fifth aspect, a random access apparatus is provided. The apparatus includes at least one module. The at least one module is configured to implement the random access method according to any one of the first aspect or the optional manners of the first aspect.

According to a sixth aspect, a random access apparatus is provided. The apparatus includes at least one module. The at least one module is configured to implement the random access method according to any one of the second aspect or the optional manners of the second aspect.

According to a seventh aspect, a random access apparatus is provided. The apparatus includes at least one module. The at least one module is configured to implement the random access method according to any one of the third aspect or the optional manners of the third aspect.

According to an eighth aspect, a random access apparatus is provided. The apparatus includes at least one module. The at least one module is configured to implement the random access method according to any one of the fourth aspect or the optional manners of the fourth aspect.

According to a ninth aspect, a communications apparatus is provided. The communications apparatus includes a processor and a memory. The memory stores an instruction. The processor is configured to execute the instruction stored in the memory, and the processor executes the instruction to implement the random access method according to any one of the first aspect or the optional manners of the first aspect, or the processor executes the instruction to implement the random access method according to any one of the third aspect or the optional manners of the third aspect.

According to a tenth aspect, a communications apparatus is provided. The communications apparatus includes a processor and a memory. The memory stores an instruction. The processor is configured to execute the instruction stored in the memory, and the processor executes the instruction to implement the random access method according to any one of the second aspect or the optional manners of the second aspect, or the processor executes the instruction to implement the random access method according to any one of the fourth aspect or the optional manners of the fourth aspect.

According to an eleventh aspect, a wireless communications system is provided. The wireless communications system includes a base station and the communications apparatus according to the ninth aspect.

According to a twelfth aspect, a wireless communications system is provided. The wireless communications system includes user equipment and the communications apparatus according to the tenth aspect.

According to a thirteenth aspect, a computer-readable storage medium is provided. The computer-readable storage medium stores an instruction. When the instruction is run on a processor, the processor is enabled to perform the random access method according to any one of the first aspect or the optional manners of the first aspect, or the processor is enabled to perform the random access method according to any one of the second aspect or the optional manners of the second aspect, or the processor is enabled to perform the random access method according to any one of the third aspect or the optional manners of the third aspect, or the processor is enabled to perform the random access method according to any one of the fourth aspect or the optional manners of the fourth aspect.

According to a fourteenth aspect, a computer program product is provided. The computer program product stores an instruction. When the instruction is run on a computer, the computer is enabled to perform the random access method according to the embodiments of this application.

According to a fifteenth aspect, a chip is provided. The chip includes a programmable logic circuit and/or a program instruction. When the chip runs, the random access method according to the embodiments of this application can be performed.

The technical solutions provided in this application have at least the following beneficial effects.

The index value of the second time domain resource is obtained by using the index value of the first time domain resource and the index difference between the first time domain resource and the second time domain resource, and the RA-RNTI is obtained by using the index value of the second time domain resource. Then, after the RAR sent by the base station is received, the CRC of the RAR is descrambled by using the obtained RA-RNTI. The first time domain resource is a time domain resource used by the UE to send the random access preamble to the base station, and the second time domain resource is a time domain resource used by the base station to receive the random access preamble sent by the UE. The index difference is determined based on the delay of data transmission between the UE and the base station. In this way, when the RTD between the UE and the base station is greater than the duration of the single slot, the UE can obtain the RA-RNTI by using the index value of the time domain resource used by the base station to receive the random access preamble, thereby ensuring that the RA-RNTI obtained by the UE is the same as the RA-RNTI obtained by the base station. In this way, the UE can successfully descramble the RAR sent by the base station, thereby ensuring random access efficiency.

DESCRIPTION OF EMBODIMENTS

To make the objectives, technical solutions, and advantages of this application clearer, the following further describes embodiments of this application in detail with reference to the accompanying drawings.

In a wireless communications system, to implement synchronization with a cell and obtain an uplink resource, a UE usually needs to perform random access. To help a reader understand the technical solutions provided in the embodiments of this application, the following briefly describes a random access process in the embodiments of this application.

Figure 1:
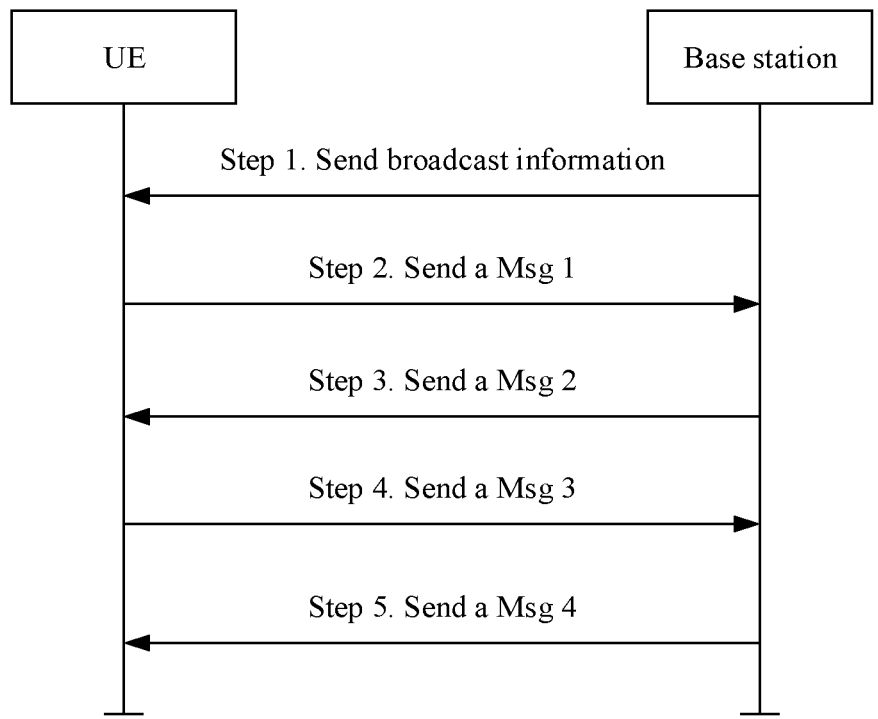
FIG. 1 is a schematic diagram of a random access process according to an embodiment of this application.

As shown in FIG. 1, a random access process may include five steps.

Step 1. A base station sends broadcast information to UE.

The broadcast information may carry an index value of a slot used by the base station to send the broadcast information.

Step 2. The UE sends a message 1 (Msg 1) to the base station.

The message 1 is also a random access preamble.

In addition, the UE may obtain and use the index value carried in the broadcast information sent by the base station as an index value of the $1^{st}$ slot that is of a PRACH and that is used by the UE to send the random access preamble to the base station. Then, the UE may calculate an RA-RNTI based on the obtained index value.

Step 3. The base station sends a message 2 (Msg 2) to the UE.

The message 2 is also an RAR.

After receiving the random access preamble sent by the UE, the base station may obtain an index value of the $1^{st}$ slot that is of a PRACH and that is used by the base station to receive the random access preamble. The base station may calculate an RA-RNTI based on the obtained index value. Then, the base station may scramble a CRC code of the RAR by using the calculated RA-RNTI. Subsequently, the base station may send the scrambled RAR to the UE.

Step 4. The UE sends a message 3 (Msg 3) to the base station.

After receiving the RAR sent by the base station, the UE may descramble the CRC of the RAR by using the RA-RNTI calculated by the UE in step 2. After the descrambling succeeds, the UE may obtain information carried in the RAR. The UE may determine, based on the information carried in the RAR, whether the base station successfully receives the random access preamble sent by the UE. After the UE determines that the base station successfully receives the random access preamble sent by the UE, the UE may send the message 3 to the base station, where the message 3 may carry an identifier of the UE.

Step 5. The base station sends a message 4 (Msg 4) to the UE.

After receiving the message 3 sent by the UE, the base station may determine, based on the identifier that is of the UE and that is carried in the message 3, whether random access of the UE succeeds. Then, the base station may send the message 4 to the UE. The base station may indicate, to the UE by using the message 4, whether the random access succeeds.

Usually, an RTD between UE and a base station in a wireless communications system is less than duration of a single slot. Therefore, a slot used by the base station to send broadcast information to the UE, the $1^{st}$t slot that is of a PRACH and that is used by the UE to send a random access preamble to the base station, and the $1^{st}$ slot that is of a PRACH and that is used by the base station to receive the random access preamble are a same slot. In this case, an RA-RNTI calculated by the UE is the same as an RA-RNTI calculated by the base station. Therefore, the UE can successfully descramble a RAR sent by the base station.

However, with development of wireless communications technologies, some wireless communications systems in which an RTD between UE and a base station is greater than duration of a single slot emerge. For example, when a base station of a wireless communications system is an artificial satellite, because a distance between the base station and UE is relatively long, an RTD between the base station and the UE is usually greater than duration of a single slot.

When the RTD between the UE and the base station is greater than the duration of the single slot, a slot used by the base station to send broadcast information to the UE, or the $1^{st}$ slot that is of a PRACH and that is used by the UE to send a random access preamble to the base station, and the $1^{st}$ slot that is of a PRACH and that is used by the base station to receive the random access preamble may be different slots. In this case, an RA-RNTI calculated by the UE may be different from an RA-RNTI calculated by the base station. In this case, the UE cannot successfully descramble a RAR. Consequently, a random access failure is caused, resulting in random access efficiency.

For example, when the RTD between the UE and the base station is greater than the duration of the single slot, if the base station sends the broadcast information to the UE in a slot whose index value is 0, the UE probably receives the broadcast information in a slot whose index value is 3. After receiving the broadcast information, the UE may send the random access preamble to the base station, where an index value of the $1^{st}$ slot that is of the PRACH and that is used by the UE to send the random access preamble to the base station is 3. The base station may receive the random access preamble sent by the UE, where an index value of the $1^{st}$ slot that is of the PRACH and that is used by the base station to receive the random access preamble sent by the UE may be 6.

In the foregoing example, the UE calculates the RA-RNTI based on the index value 0, and the base station calculates the RA-RNTI based on the index value 6. Consequently, the RA-RNTI calculated by the UE is different from the RA-RNTI calculated by the base station. In this case, the UE cannot successfully descramble the RAR. Consequently, a random access failure is caused, resulting in affecting random access efficiency.

The embodiments of this application provide a random access method and apparatus, a device, and a storage medium. In the random access method provided in the embodiments of this application, UE may obtain an index value of a second time domain resource by using an index value of a first time domain resource and an index difference between the first time domain resource and the second time domain resource, and obtain an RA-RNTI by using the index value of the second time domain resource. Then, after receiving a RAR sent by a base station, the UE may descramble a CRC of the RAR by using the obtained RA-RNTI. The first time domain resource is a time domain resource used by the UE to send a random access preamble to the base station, and the second time domain resource is a time domain resource used by the base station to receive the random access preamble sent by the UE. The index difference is determined based on the delay of data transmission between the UE and the base station. In this way, when an RTD between the UE and the base station is greater than duration of a single slot, the UE can obtain the RA-RNTI by using the index value of the time domain resource used by the base station to receive the random access preamble, thereby ensuring that the RA-RNTI obtained by the UE is the same as an RA-RNTI obtained by the base station. In this way, the UE can successfully descramble the RAR sent by the base station, thereby ensuring the random access efficiency.

Figure 2:
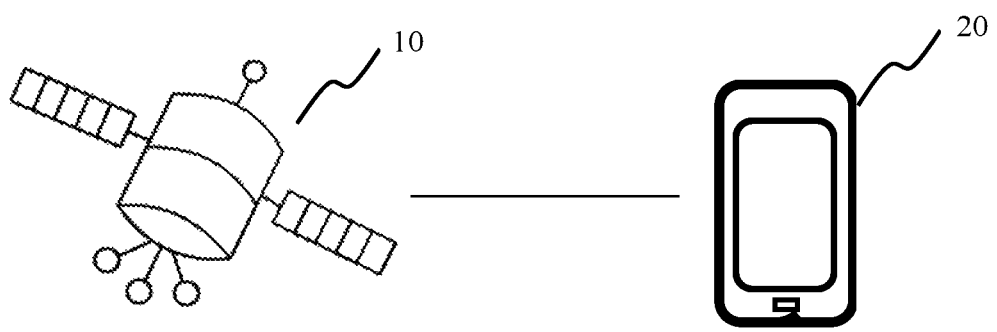
FIG. 2 is a schematic diagram of an implementation environment according to an embodiment of this application.

FIG. 2 is a schematic diagram of an implementation environment related to a random access method according to an embodiment of this application. As shown in FIG. 2, the implementation environment may include a base station 10 and UE 20. The base station 10 may be connected to the UE 20 by using a wireless communications network. The UE 20 may be any UE served by the base station 10.

The wireless communications network may be a fifth generation mobile communications technology (5G) communications network, or may be a Long-Term Evolution (LTE) communications network or another wireless communications network similar to an LTE communications network or a 5G communications network.

An RTD between the UE 20 and the base station 10 is greater than duration of a single slot. In an embodiment of this application, the base station 10 may be an artificial satellite.

Figure 3:
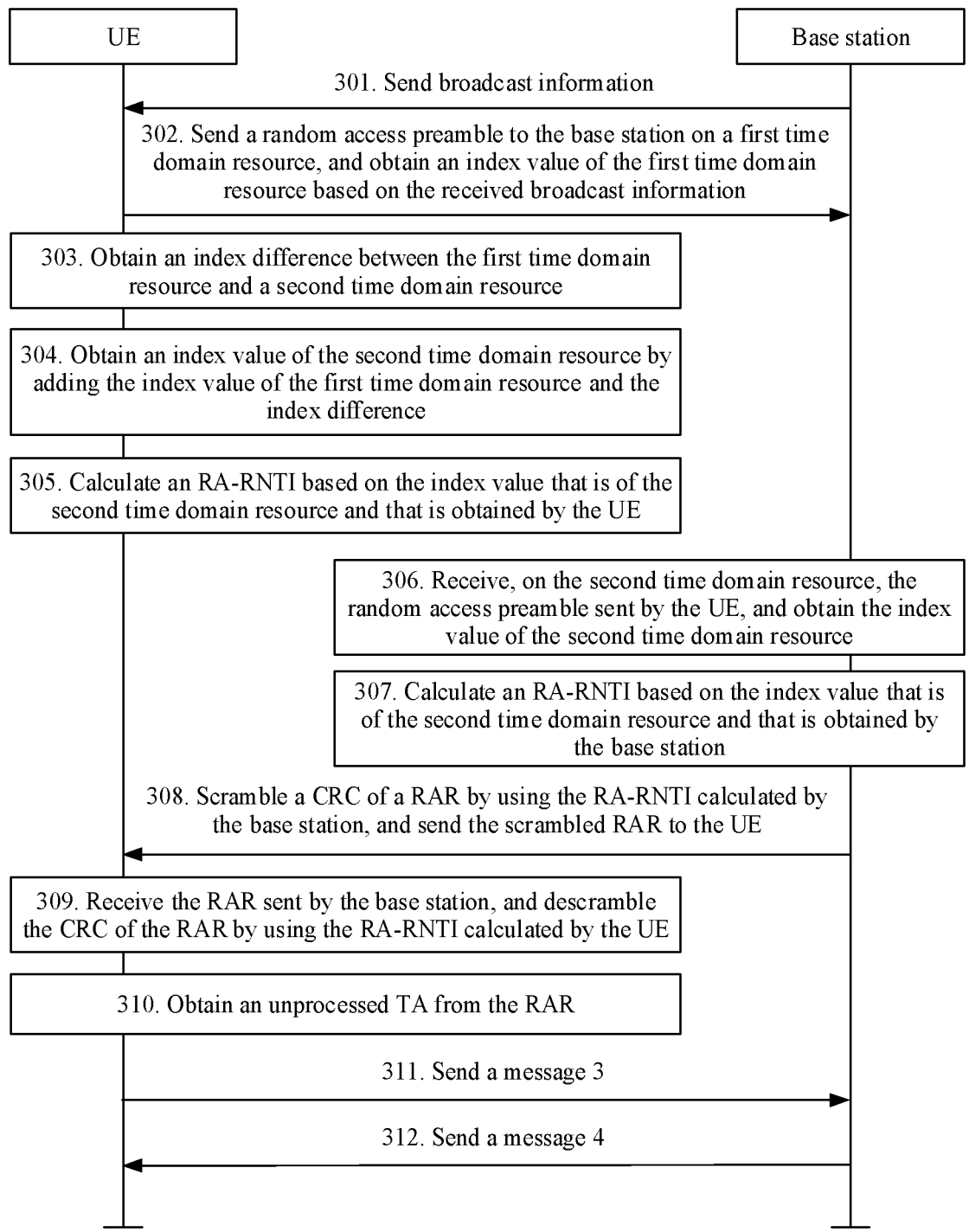
FIG. 3 is a flowchart of a random access method according to an embodiment of this application.

FIG. 3 is a flowchart of a random access method according to an embodiment of this application. The random access method may be applied to the implementation environment shown in FIG. 2. As shown in FIG. 3, the random access method may include the following steps.

Step 301. A base station sends broadcast information to UE.

The broadcast information sent by the base station to the UE may be used to indicate an index value of a first time domain resource. The first time domain resource is a time domain resource used by the UE to send a random access preamble to the base station. In an embodiment of this application, the first time domain resource may be the $1^{st}$ slot that is of a PRACH and that is used by the UE to send the random access preamble to the base station.

The broadcast information sent by the base station to the UE may carry an index value of a slot used by the base station to send the broadcast information. In a subsequent step, the UE may obtain and use the index value carried in the broadcast information as an index value of the $1^{st}$ slot that is of the PRACH and that is used by the UE to send the random access preamble to the base station, that is, the index value of the first time domain resource.

In this embodiment of this application, a rule for assigning a value to an index value of a time domain resource (where the time domain resource may be a slot) may include the following two points: 1. A difference between index values of any two adjacent time domain resources in time domain is 1. 2. An index value of a relatively front time domain resource in time domain is less than an index value of a relatively back time domain resource in time domain.

Step 302. The UE sends the random access preamble to the base station on the first time domain resource, and obtains the index value of the first time domain resource based on the received broadcast information.

As described above, after receiving the broadcast information sent by the base station, the UE may obtain and use the index value carried in the broadcast information as the index value of the $1^{st}$ slot that is of the PRACH and that is used by the UE to send the random access preamble to the base station, that is, as the index value of the first time domain resource.

Step 303. The UE obtains an index difference between the first time domain resource and a second time domain resource.

The second time domain resource is a time domain resource used by the base station to receive the random access preamble sent by the UE. In an embodiment of this application, the second time domain resource may be the $1^{st}$ slot that is of a PRACH and that is used by the base station to receive the random access preamble sent by the UE.

The index difference between the first time domain resource and the second time domain resource refers to an absolute value of a difference between the index value of the first time domain resource and an index value of the second time domain resource. In this embodiment of this application, the index difference may be determined based on the delay of data transmission between the UE and the base station. In a possible implementation, the "delay of data transmission between the UE and the base station" may be represented by using an RTD between the UE and the base station.

This embodiment of this application provides two manners of obtaining the index difference by the UE. The following describes the two manners one by one.

In a first manner, the UE receives a first offset value sent by the base station, and calculates the index difference based on the first offset value.

This manner may include the following steps.

A1. The base station obtains a shortest distance between the base station and a target cell.

The target cell may be a cell in which the UE is located in this embodiment of this application, and the shortest distance between the base station and the target cell is a geographical shortest distance between the base station and the target cell.

Figure 4:
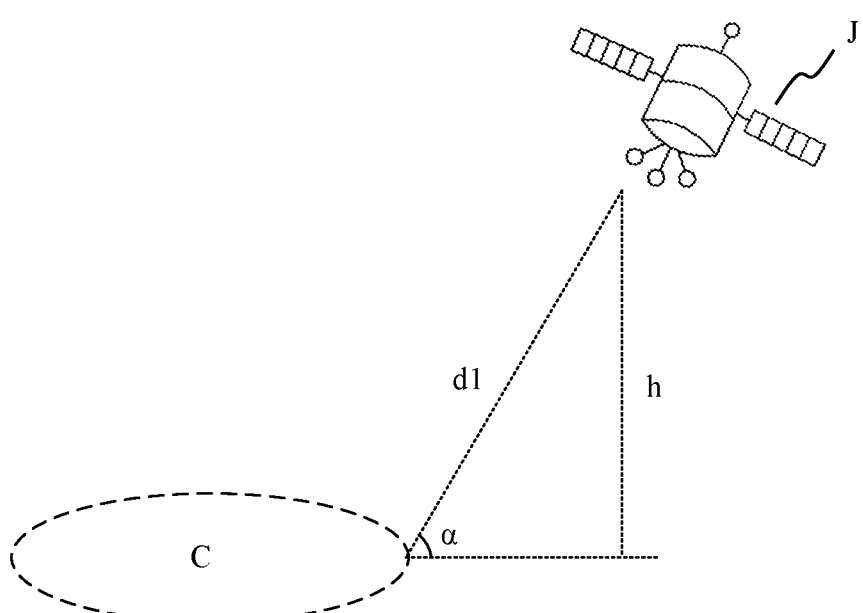
FIG. 4 is a schematic diagram of a shortest distance between UE and a base station according to an embodiment of this application.

As shown in FIG. 4, when the base station is an artificial satellite, a shortest distance between a base station J and a target cell C may be d1, and the shortest distance d1 may be calculated by the base station J based on an orbit height h of the base station J and a beam angle α.

A2. The base station calculates a minimum RTD based on the shortest distance.

The minimum RTD refers to a possible minimum RTD value between the base station and the UE. Clearly, an actual RTD between the base station and the UE should be greater than or equal to the minimum RTD.

The minimum RTD can be obtained by multiplying a quotient by 2 after the quotient is obtained by dividing the shortest distance obtained in step A1 by a speed of an electromagnetic wave.

A3. The base station obtains the first offset value by performing a rounding operation on a quotient obtained by dividing the minimum RTD by the duration of the single slot.

It should be noted that, duration of a single slot is usually 0.5 milliseconds (ms) in an LTE communications system, and duration of a single slot may be 1 ms, 0.5 ms, or the like in a 5G communications system.

In this embodiment of this application, the rounding operation may be a rounding-down operation, or may be a rounding-up operation.

A4. The base station sends the first offset value to the UE.

The base station may send the first offset value to the UE through broadcast.

Optionally, the base station may broadcast, to the UE, a system information block (SIB) carrying the first offset value. The SIB may include an offset value field, and the offset value field is used to carry the first offset value. It should be noted that because an RTD between an artificial satellite (base station) in transparent forwarding mode (i.e., bent pipe) and UE is usually relatively large, a first offset value calculated by the base station is usually relatively large, and the first offset value occupies a relatively large quantity of bits. Therefore, in consideration of the foregoing case, a quantity of bits occupied by an offset value field in a SIB is usually greater than a target threshold. In this embodiment of this application, the target threshold may be 10.

Optionally, the base station may send the first offset value to the UE in step 301. In this case, the broadcast information in step 301 may carry the first offset value.

A5. The UE calculates an index difference based on the first offset value.

Usually, a difference between the actual RTD and the minimum RTD between the UE and the base station is less than or equal to the duration of the single slot. Therefore, a difference between a quantity of slots (where the quantity of slots is an integer) included in the actual RTD and a quantity of slots (where the quantity of slots is an integer) included in the minimum RTD should be 0 or 1, where the quantity of slots included in the actual RTD is the index difference.

Based on this, to cover all possible values of the actual RTD between the UE and the base station, when the rounding operation in step A3 is the rounding-down operation, the index difference may include a first index difference and a second index difference, where the first index difference is equal to the first offset value plus 1, and the second index difference is equal to the first offset value plus 2, when the rounding operation in step A3 is the rounding-up operation, the index difference may include the first index difference and a third index difference, where the third index difference is equal to the first offset value.

For example, when the minimum RTD is 2.8 ms, the actual RTD between the UE and the base station may be 2.9 ms, 3.2 ms, or the like.

When the rounding operation in step A3 is the rounding-down operation, and the duration of the single slot is 1 ms, the first offset value is 2. In this case, if the actual RTD between the UE and the base station is 2.9 ms, the quantity of slots included in the actual RTD is 3 and is equal to the first index difference, if the actual RTD between the UE and the base station is 3.2 ms, the quantity of slots included in the actual RTD is 4 and is equal to the second index difference.

When the rounding operation in step A3 is the rounding-up operation, and the duration of the single slot is 1 ms, the first offset value is 3. In this case, if the actual RTD between the UE and the base station is 2.9 ms, the quantity of slots included in the actual RTD is 3 and is equal to the third index difference, if the actual RTD between the UE and the base station is 3.2 ms, the quantity of slots included in the actual RTD is 4 and is equal to the first index difference.

In a second manner, the UE receives indication information sent by the base station, and obtains the index difference based on the indication information.

This manner may include the following steps.

B1. The base station obtains a rough RTD between the base station and the UE.

When the base station is an artificial satellite, the base station may obtain the rough RTD based on an orbit height and a payload mode of the base station. The payload mode may include a transparent forwarding mode and a non-transparent forwarding mode (i.e., regenerative) mode. The transparent forwarding mode means that the artificial satellite does not process communications data sent by the UE, but forwards the communications data sent by the UE to a ground device. The ground device processes the communications data sent by the UE. The non-transparent forwarding mode means that the artificial satellite processes the communications data sent by the UE.

As the name implies, the rough RTD refers to a non-precise value of an RTD between the base station and the UE. In an actual application, an actual RTD between the base station and the UE may be less than the rough RTD, or may be greater than the rough RTD, or may be exactly equal to the rough RTD. However, a difference between the actual RTD and the rough RTD between the base station and the UE is usually less than a target difference threshold, and the target difference threshold is usually less than or equal to the duration of the single slot. In other words, although the rough RTD is not precise, there is no great difference between the actual RTD and the RTD between the base station and the UE.

B2. The base station sends the indication information to the UE, where the indication information is used to indicate the rough RTD.

The base station may send the indication information to the UE through broadcast. Optionally, the base station may broadcast, to the UE, a SIB carrying the indication information. Optionally, the base station may send the indication information to the UE in step 301. In this case, the broadcast information in step 301 may carry the indication information.

B3. After receiving the indication information, the UE obtains the rough RTD based on the indication information.

In this embodiment of this application, the UE may maintain a comparison table between the indication information and the rough RTD. After receiving the indication information, the UE may query the comparison table based on the indication information, to obtain the rough RTD corresponding to the indication information from the comparison table.

Table 1 is a possible example of the comparison table maintained in the UE.

TABLE 1

| Orbit height | Payload mode | Rough RTD (ms) | Indication information |
|---|---|---|---|
| Low earth orbit (LEO) height of 600 kilometers (km) | Transparent forwarding mode | 12.88 | 000 |
| | Non-transparent forwarding mode | 28.408 | 001 |
| LEO height of 1,500 km | Transparent forwarding mode | 24.32 | 010 |
| | Non-transparent forwarding mode | 51.661 | 011 |
| | Transparent forwarding mode | 93.45 | 100 |
| Medium earth orbit (MEO) height of 10,000 km | Non-transparent forwarding mode | 190.38 | 101 |
| Geostationary earth orbit (GEO) height of 35,786 km | Transparent forwarding mode | 270.572 | 110 |
| | Non-transparent forwarding mode | 544.751 | 111 |

B4. The UE obtains a second offset value by performing a rounding operation on a quotient obtained by dividing the rough RTD by the duration of the single slot.

Similar to that in the foregoing step A3, the rounding operation herein may be a rounding-up operation, or may be a rounding-down operation.

B5. The UE obtains the index difference based on the second offset value.

It can be learned from the foregoing description that a difference between a quantity of slots (where the quantity of slots is an integer) included in the actual RTD between the UE and the base station and a quantity of slots (where the quantity of slots is an integer) included in the rough RTD may be −1, 0, or 1, where the quantity of slots included in the actual RTD is the index difference.

Based on this, to cover all possible values of the actual RTD between the UE and the base station, when the rounding operation in step B4 is the rounding-up operation, the index difference may include a fourth index difference, a fifth index difference, and a sixth index difference, where the fourth index difference is equal to the second offset value minus 1, the fifth index difference is equal to the second offset value, and the sixth index difference is equal to the second offset value plus 1, when the rounding operation in step B4 is the rounding-down operation, the index difference may include the fifth index difference, the sixth index difference, and a seventh index difference, where the seventh index difference is equal to the second offset value plus 2.

For example, when the rough RTD is 12.88 ms, the actual RTD between the UE and the base station may be 11.99 ms, 12.55 ms, 13.1 ms, or the like.

When the rounding operation in step B4 is the rounding-up operation, and the duration of the single slot is 1 ms, the second offset value is 13. In this case, if the actual RTD between the UE and the base station is 11.99 ms, the quantity of slots included in the actual RTD is 12 and is equal to the fourth index difference, if the actual RTD between the UE and the base station is 12.55 ms, the quantity of slots included in the actual RTD is 13 and is equal to the fifth index difference, if the actual RTD between the UE and the base station is 13.1 ms, the quantity of slots included in the actual RTD is 14 and is equal to the sixth index difference.

When the rounding operation in step B4 is the rounding-down operation, and the duration of the single slot is 1 ms, the second offset value is 12. In this case, if the actual RTD between the UE and the base station is 11.99 ms, the quantity of slots included in the actual RTD is 12 and is equal to the fifth index difference, if the actual RTD between the UE and the base station is 12.55 ms, the quantity of slots included in the actual RTD is 13 and is equal to the sixth index difference, if the actual RTD between the UE and the base station is 13.1 ms, the quantity of slots included in the actual RTD is 14 and is equal to the seventh index difference.

Step 304. The UE obtains the index value of the second time domain resource by adding the index value of the first time domain resource and the index difference.

In correspondence to the first manner in which the UE obtains the index difference in step 303, when the rounding operation in step A3 is the rounding-down operation, the UE may obtain a first index value of the second time domain resource by adding the first index difference and the index value of the first time domain resource, and the UE may obtain a second index value of the second time domain resource by adding the second index difference and the index value of the first time domain resource. When the rounding operation in step A3 is the rounding-up operation, the UE may obtain the first index value of the second time domain resource by adding the first index difference and the index value of the first time domain resource, and the UE may obtain a third index value of the second time domain resource by adding the third index difference and the index value of the first time domain resource.

In correspondence to the second manner in which the UE obtains the index difference in step 303, when the rounding operation in step B4 is the rounding-up operation, the UE may obtain a fourth index value of the second time domain resource by adding the fourth index difference and the index value of the first time domain resource, the UE may obtain a fifth index value of the second time domain resource by adding the fifth index difference and the index value of the first time domain resource, and the UE may further obtain a sixth index value of the second time domain resource by adding the sixth index difference and the index value of the first time domain resource. When the rounding operation in step B4 is the rounding-down operation, the UE may obtain the fifth index value of the second time domain resource by adding the fifth index difference and the index value of the first time domain resource, the UE may obtain the sixth index value of the second time domain resource by adding the sixth index difference and the index value of the first time domain resource, and the UE may obtain a seventh index value of the second time domain resource by adding the seventh index difference and the index value of the first time domain resource.

Step 305. The UE calculates an RA-RNTI based on the index value that is of the second time domain resource and that is obtained by the UE.

Optionally, the UE may calculate the RA-RNTI by using a fourth formula, where the fourth formula includes:

$$\text{RA-RNTI}=1+s\_id\_\text{UE}+14\times t\_id\_\text{gNB}\_1+14\times 80\times f\_id\_\text{UE}+14\times 80\times 8\times ul\_carrier\_id\_\text{UE},$$

where $s\_id\_\text{UE}$ is an index value of the $1^{st}$ orthogonal frequency-division multiplexing (OFDM) symbol that is of the PRACH and that is used by the UE to send the random access preamble to the base station. $t\_id\_\text{gNB}\_1$ is an index value obtained by the UE, where the index value is of the $1^{st}$ slot (that is, the index value of the second time domain resource) that is of the PRACH and that is used by the base station to receive the random access preamble sent by the UE. $f\_id\_\text{UE}$ is an index value of a frequency domain in which the PRACH used by the UE to send the random access preamble to the base station is located. A value of $ul\_carrier\_id\_\text{UE}$ is 0 or 1. When an uplink carrier used by the UE to send the random access preamble to the base station is a normal uplink (NUL) carrier, the value of $ul\_carrier\_id\_\text{UE}$ is 0. When an uplink carrier used by the UE to send the random access preamble to the base station is a supplementary uplink (SUL) carrier, the value of $ul\_carrier\_id\_\text{UE}$ is 1.

It should be noted that, in correspondence to the first manner in which the UE obtains the index difference in step 303, when the rounding operation in step A3 is the rounding-down operation, $t\_id\_\text{gNB}\_1$ may be the first index value and the second index value. When $t\_id\_\text{gNB}\_1$ is the first index value, the RA-RNTI calculated by the UE is a first RA-RNTI. When $t\_id\_\text{gNB}\_1$ is the second index value, the RA-RNTI calculated by the UE is a second RA-RNTI. When the rounding operation in step A3 is the rounding-up operation, $t\_id\_\text{gNB}\_1$ may be the first index value and the third index value. When $t\_id\_\text{gNB}\_1$ is the first index value, the RA-RNTI calculated by the UE is the first RA-RNTI. When $t\_id\_\text{gNB}\_1$ is the third index value, the RA-RNTI calculated by the UE is a third RA-RNTI.

In correspondence to the second manner in which the UE obtains the index difference in step 303, when the rounding operation in step B4 is the rounding-up operation, $t\_id\_\text{gNB}\_1$ may be the fourth index value, the fifth index value, and the sixth index value. When $t\_id\_\text{gNB}\_1$ is the fourth index value, the RA-RNTI calculated by the UE is a fourth RA-RNTI. When $t\_id\_\text{gNB}\_1$ is the fifth index value, the RA-RNTI calculated by the UE is a fifth RA-RNTI. When $t\_id\_\text{gNB}\_1$ is the sixth index value, the RA-RNTI calculated by the UE is a sixth RA-RNTI. When the rounding operation in step B4 is the rounding-down operation, t_id_gNB_1 may be the fifth index value, the sixth index value, and the seventh index value. When t_id_gNB_1 is the fifth index value, the RA-RNTI calculated by the UE is the fifth RA-RNTI. When t_id_gNB_1 is the sixth index value, the RA-RNTI calculated by the UE is the sixth RA-RNTI. When t_id_gNB_1 is the seventh index value, the RA-RNTI calculated by the UE is a seventh RA-RNTI.

Step 306. The base station receives, on the second time domain resource, the random access preamble sent by the UE, and obtains the index value of the second time domain resource.

As described above, the index difference obtained by the UE in step 303 may cover all the possible values of the actual RTD between the UE and the base station.

In correspondence to the first manner in which the UE obtains the index difference in step 303, when the rounding operation in step A3 is the rounding-down operation, the first index value and the second index value of the second time domain resource that are calculated by the UE may cover all possible values of an actual index value of the second time domain resource, in other words, in this case, the index value that is of the second time domain resource and that is obtained by the base station is one of the first index value and the second index value of the second time domain resource that are calculated by the UE in step 304. When the rounding operation in step A3 is the rounding-up operation, the first index value and the third index value of the second time domain resource that are calculated by the UE may cover all possible values of an actual index value of the second time domain resource. In other words, in this case, the index value that is of the second time domain resource and that is obtained by the base station is one of the first index value and the third index value of the second time domain resource that are calculated by the UE in step 304.

In correspondence to the second manner in which the UE obtains the index difference in step 303, when the rounding operation in step B4 is the rounding-up operation, the fourth index value, the fifth index value, and the sixth index value of the second time domain resource that are calculated by the UE may cover all possible values of an actual index value of the second time domain resource. In other words, in this case, the index value that is of the second time domain resource and that is obtained by the base station is one of the fourth index value, the fifth index value, and the sixth index value of the second time domain resource that are calculated by the UE in step 304. When the rounding operation in step B4 is the rounding-down operation, the fifth index value, the sixth index value, and the seventh index value of the second time domain resource that are calculated by the UE may cover all possible values of an actual index value of the second time domain resource. In other words, in this case, the index value that is of the second time domain resource and that is obtained by the base station is one of the fifth index value, the sixth index value, and the seventh index value of the second time domain resource that are calculated by the UE in step 304.

Step 307. The base station calculates an RA-RNTI based on the index value that is of the second time domain resource and that is obtained by the base station.

The base station may calculate the RA-RNTI based on a fifth formula, where the fifth formula includes:

$$\text{RA-RNTI}=1+s\_id\_gNB+14\times t\_id\_gNB\_2+14\times 80\times f\_id\_gNB+14\times 80\times 8\times ul\_carrier\_id\_gNB,$$

where s_id_gNB is an index value of the 1st OFDM symbol that is of the PRACH and that is used by the base station to receive the random access preamble sent by the UE. t_id_gNB_2 is an index value obtained by the base station, where the index value is of the 1st slot (that is, the index value of the second time domain resource) that is of the PRACH and that is used by the base station to receive the random access preamble sent by the UE. f_id_gNB is an index value of a frequency domain in which the PRACH used by the base station to receive the random access preamble sent by the UE is located. A value of ul_carrier_id_gNB is 0 or 1. When an uplink carrier used by the base station to receive the random access preamble sent by the UE is a NUL carrier, the value of ul_carrier_id_gNB is 0. When an uplink carrier used by the base station to receive the random access preamble sent by the UE is a SUL carrier, the value of ul_carrier_id_gNB is 1.

It should be noted that s_id_UE in the fourth formula is equal to s_id_gNB in the fifth formula, f_id_UE in the fourth formula is equal to f_id_gNB in the fifth formula, and ul_carrier_id_UE in the fourth formula is equal to ul_carrier_id_gNB in the fifth formula.

Based on this, in correspondence to the first manner in which the UE obtains the index difference in step 303, when the rounding operation in step A3 is the rounding-down operation, the RA-RNTI calculated by the base station is one of the first RA-RNTI and the second RA-RNTI that are calculated by the UE. When the rounding operation in step A3 is the rounding-up operation, the RA-RNTI calculated by the base station is one of the first RA-RNTI and the third RA-RNTI that are calculated by the UE.

In correspondence to the second manner in which the UE obtains the index difference in step 303, when the rounding operation in step B4 is the rounding-up operation, the RA-RNTI calculated by the base station is one of the fourth RA-RNTI, the fifth RA-RNTI, and the sixth RA-RNTI that are calculated by the UE. When the rounding operation in step B4 is the rounding-down operation, the RA-RNTI calculated by the base station is one of the fifth RA-RNTI, the sixth RA-RNTI, and the seventh RA-RNTI that are calculated by the UE.

Step 308. The base station scrambles a CRC of a RAR by using the RA-RNTI calculated by the base station, and sends the scrambled RAR to the UE.

It should be noted that, when a length of the RA-RNTI calculated by the base station is less than a length of the CRC of the RAR, the base station may partially scramble the CRC of the RAR by using the RA-RNTI. When a length of the RA-RNTI calculated by the base station is not less than a length of the CRC of the RAR, the base station may perform overall scrambling on the CRC of the RAR by using the RA-RNTI.

Step 309. The UE receives the RAR sent by the base station, and descrambles the CRC of the RAR by using the RA-RNTI calculated by the UE.

In correspondence to the first manner in which the UE obtains the index difference in step 303, when the rounding operation in step A3 is the rounding-down operation, the UE may descramble the CRC of the RAR by using the first RA-RNTI and the second RA-RNTI separately. In this case, the RA-RNTI calculated by the base station is one of the first RA-RNTI and the second RA-RNTI that are calculated by the UE. Therefore, the UE can successfully descramble the RAR. When the rounding operation in step A3 is the rounding-up operation, the UE may descramble the CRC of the RAR by using the first RA-RNTI and the third RA-RNTI separately. In this case, the RA-RNTI calculated by the base station is one of the first RA-RNTI and the third RA-RNTI that are calculated by the UE. Therefore, the UE can successfully descramble the RAR.

In correspondence to the second manner in which the UE obtains the index difference in step 303, when the rounding operation in step B4 is the rounding-up operation, the UE may descramble the CRC of the RAR by using the fourth RA-RNTI, the fifth RA-RNTI, and the sixth RA-RNTI separately. In this case, the RA-RNTI calculated by the base station is one of the fourth RA-RNTI, the fifth RA-RNTI, and the sixth RA-RNTI that are calculated by the UE. Therefore, the UE can successfully descramble the RAR. When the rounding operation in step B4 is the rounding-down operation, the UE may descramble the CRC of the RAR by using the fifth RA-RNTI, the sixth RA-RNTI, and the seventh RA-RNTI separately. In this case, the RA-RNTI calculated by the base station is one of the fifth RA-RNTI, the sixth RA-RNTI, and the seventh RA-RNTI that are calculated by the UE. Therefore, the UE can successfully descramble the RAR.

Step 310. The UE obtains, from the RAR, a TA before processing.

In this embodiment of this application, because the RTD between the UE and the base station is relatively large, a TA between the base station and the UE is also relatively large. Therefore, a quantity of bits occupied by the TA is possibly to be greater than a quantity of bits in a field that is in the RAR and that is used to carry a TA. In consideration of this case, the RAR sent by the base station to the UE may carry a processed TA, and a quantity of bits occupied by the processed TA is less than a quantity of bits occupied by the unprocessed TA. Therefore, the quantity of bits occupied by the processed TA is generally less than the quantity of bits in the field that is in the RAR and that is used to carry a TA. In this way, normal transmission of the TA can be ensured.

In correspondence to the first manner in which the UE obtains the index difference in step 303, when successfully descrambling the CRC of the RAR by using the first RA-RNTI or the third RA-RNTI, the UE may calculate, based on the processed TA in the RAR by using a first formula, the unprocessed TA, where the first formula includes:

$$TA = TA_{new} + p.$$

TA is the unprocessed TA, $TA_{new}$ is the processed TA, and p is the first offset value.

When successfully descrambling the CRC of the RAR by using the second RA-RNTI, the UE may calculate, based on the processed TA by using a second formula, the unprocessed TA, where the second formula includes:

$$TA = TA_{new} + p + 1.$$

TA is the unprocessed TA, $TA_{new}$ is the processed TA, and p is the first offset value.

In correspondence to the first manner in which the UE obtains the index difference in step 303, when successfully descrambling the CRC of the RAR by using the fourth RA-RNTI, the fifth RA-RNTI, the sixth RA-RNTI, or the seventh RA-RNTI, the UE may calculate, based on the processed TA by using a third formula, the unprocessed TA, where the third formula includes:

$$TA = TA_{new} + RTD_{rough}.$$

TA is the unprocessed TA, $TA_{new}$ is the processed TA, and $RTD_{rough}$ is the rough RTD.

Step 311. The UE sends a message 3 to the base station.

Step 312. The base station sends a message 4 to the UE.

Technical processes of step 311 and step 312 are similar to the technical processes of step 4 and step 5 in the foregoing random access process, and details are not described herein again in this embodiment of this application.

In conclusion, according to the random access method provided in this embodiment of this application, the index value of the second time domain resource is obtained by using the index value of the first time domain resource and the index difference between the first time domain resource and the second time domain resource, and the RA-RNTI is obtained by using the index value of the second time domain resource. Then, after the RAR sent by the base station is received, the CRC of the RAR is descrambled by using the obtained RA-RNTI. The first time domain resource is a time domain resource used by the UE to send the random access preamble to the base station, and the second time domain resource is a time domain resource used by the base station to receive the random access preamble sent by the UE. The index difference is determined based on the delay of data transmission between the UE and the base station. In this way, when the RTD between the UE and the base station is greater than the duration of the single slot, the UE can obtain the RA-RNTI by using the index value of the time domain resource used by the base station to receive the random access preamble, thereby ensuring that the RA-RNTI obtained by the UE is the same as the RA-RNTI obtained by the base station. In this way, the UE can successfully descramble the RAR sent by the base station, thereby ensuring random access efficiency.

Figure 5:
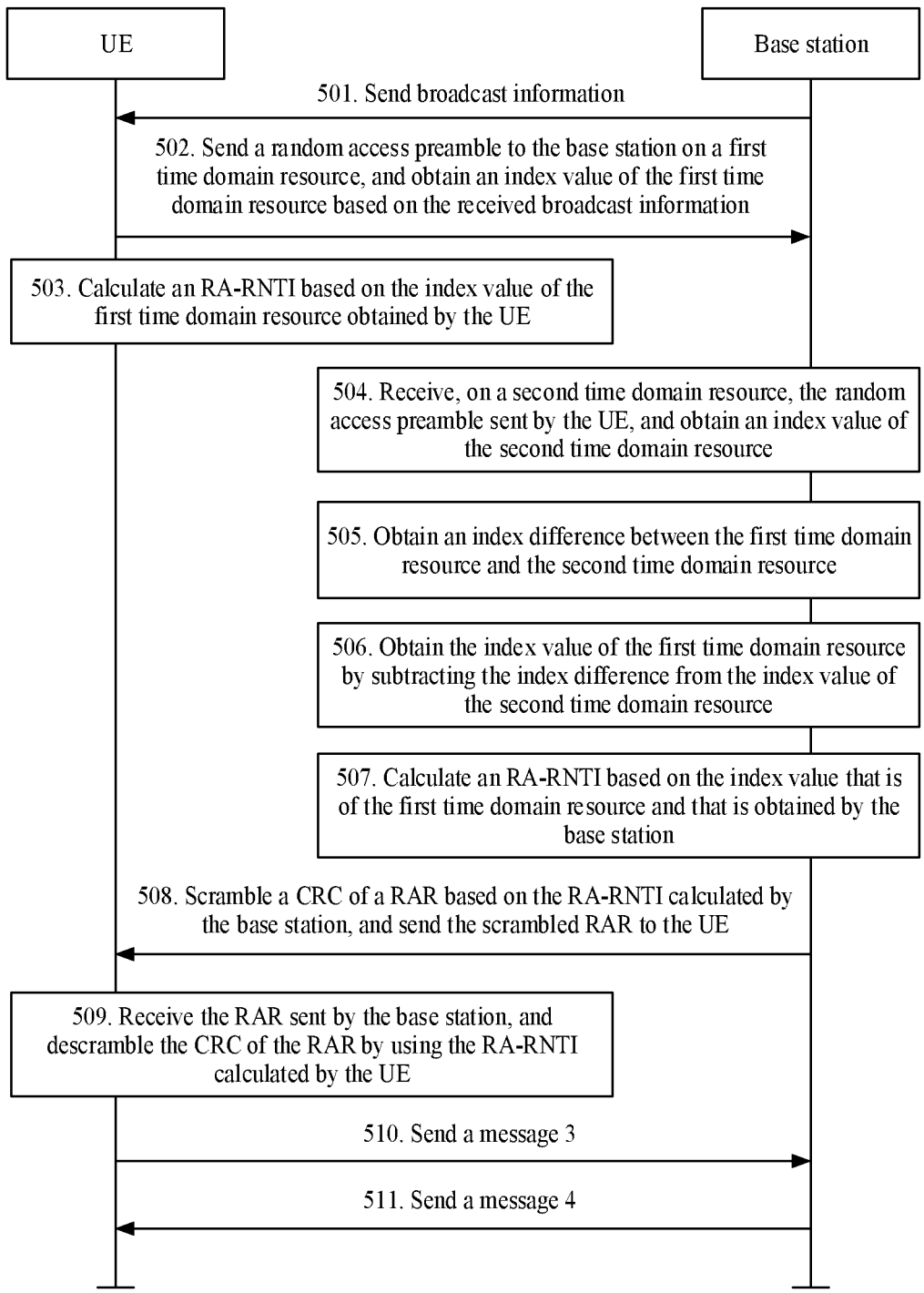
FIG. 5 is a flowchart of another random access method according to an embodiment of this application.

FIG. 5 is a flowchart of a random access method according to an embodiment of this application. The random access method may be applied to the implementation environment shown in FIG. 2. As shown in FIG. 5, the random access method may include the following steps.

Step 501. A base station sends broadcast information to UE.

A technical process of step 501 is similar to the technical process of step 301, and details are not described herein again in this embodiment of this application.

Step 502. The UE sends a random access preamble to the base station on a first time domain resource, and obtains an index value of the first time domain resource based on the received broadcast information.

A technical process of step 502 is similar to the technical process of step 302, and details are not described herein again in this embodiment of this application.

Step 503. The UE calculates an RA-RNTI based on the index value that is of the first time domain resource and that is obtained by the UE.

Optionally, the UE may calculate the RA-RNTI by using a sixth formula, where the sixth formula includes:

$$RA\text{-}RNTI = 1 + s\_id\_UE + 14 \times t\_id\_UE\_1 + 14 \times 80 \times f\_i\text{-}d\_UE + 14 \times 80 \times 8 \times ul\_carrier\_id\_UE,$$

where s_id_UE is an index value of the $1^{st}$ OFDM symbol that is of a PRACH and that is used by the UE to send the random access preamble to the base station. t_id_UE_1 is an index value obtained by the UE, where the index value is of the $1^{st}$ slot (that is, the index value of the first time domain resource) that is of the PRACH and that is used by the UE to send the random access preamble to the base station. f_id_UE is an index value of a frequency domain in which the PRACH used by the UE to send the random access preamble to the base station is located. A value of ul_carrier_id_UE is 0 or 1. When an uplink carrier used by the UE to send the random access preamble to the base station is a NUL carrier, the value of ul_carrier_id_UE is 0. When an uplink carrier used by the UE to send the random access preamble to the base station is a SUL carrier, a value of ul_carrier_id_UE is 1.

Step 504. The base station receives, on a second time domain resource, the random access preamble sent by the UE, and obtains an index value of the second time domain resource.

After receiving the random access preamble sent by the UE, the base station may measure the random access preamble. Based on the measurement, the base station can obtain a TA between the base station and the UE.

Step 505. The base station obtains an index difference between the first time domain resource and the second time domain resource.

As described above, the index difference may be determined based on the delay of data transmission between the UE and the base station. In a possible implementation, the "delay of data transmission between the UE and the base station" may be represented by using the TA between the UE and the base station. A quantity of slots (where the quantity of slots is an integer) included in the TA between the UE and the base station is the index difference.

In this embodiment of this application, the base station may obtain the index difference by performing a rounding-up operation on a quotient obtained by dividing the TA between the base station and the UE by duration of a single slot.

Step 506. The base station obtains the index value of the first time domain resource by subtracting the index difference from the index value of the second time domain resource.

Step 507. The base station calculates an RA-RNTI based on the index value that is of the first time domain resource and that is obtained by the base station.

Optionally, the base station may calculate the RA-RNTI by using a seventh formula, where the seventh formula includes:

$$RA\text{-}RNTI = 1 + s\_id\_gNB + 14 \times t\_id\_UE\_2 + 14 \times 80 \times f\_id\_gNB + 14 \times 80 \times 8 \times ul\_carrier\_id\_gNB,$$

where $s\_id\_gNB$ is an index value of the $1^{st}$ OFDM symbol that is of a PRACH and that is used by the base station to receive the random access preamble sent by the UE. $t\_id\_UE\_2$ is an index value obtained by the base station, where the index value is of the $1^{st}$ slot (that is, the index value of the first time domain resource) that is of the PRACH and that is used by the UE to send the random access preamble to the base station. $f\_id\_gNB$ is an index value of a frequency domain in which the PRACH used by the base station to receive the random access preamble sent by the UE is located. A value of $ul\_carrier\_id\_gNB$ is 0 or 1. When an uplink carrier used by the base station to receive the random access preamble sent by the UE is a NUL carrier, the value of $ul\_carrier\_id\_gNB$ is 0. When an uplink carrier used by the base station to receive the random access preamble sent by the UE is a SUL carrier, the value of $ul\_carrier\_id\_gNB$ is 1.

It should be noted that $s\_id\_UE$ in the sixth formula is equal to $s\_id\_gNB$ in the seventh formula, $f\_id\_UE$ in the sixth formula is equal to $f\_id\_gNB$ in the seventh formula, and $ul\_carrier\_id\_UE$ in the sixth formula is equal to $ul\_carrier\_id\_gNB$ in the seventh formula.

In addition, the index value that is of the first time domain resource and that is obtained by the base station is equal to the index value that is of the first time domain resource and that is obtained by the UE, that is, $t\_id\_UE\_1$ is equal to $t\_id\_UE\_2$. Therefore, the RA-RNTI calculated by the base station is the same as the RA-RNTI calculated by the UE.

Step 508. The base station scrambles a CRC of a RAR by using the RA-RNTI calculated by the base station, and sends the scrambled RAR to the UE.

A technical process of step 508 is similar to the technical process of step 308, and details are not described herein again in this embodiment of this application.

Step 509. The UE receives the RAR sent by the base station, and descrambles the CRC of the RAR by using the RA-RNTI calculated by the UE.

As described above, the RA-RNTI calculated by the base station is the same as the RA-RNTI calculated by the UE. Therefore, the UE may successfully descramble the RAR by using the RA-RNTI calculated by the UE.

Step 510. The UE sends a message 3 to the base station.

Step 511. The base station sends a message 4 to the UE.

Technical processes of step 510 and step 511 are similar to the technical processes of step 4 and step 5 in the foregoing random access process, and details are not described herein again in this embodiment of this application.

In conclusion, according to the random access method provided in this embodiment of this application, the index value of the first time domain resource is obtained by using the index value of the second time domain resource and the index difference between the first time domain resource and the second time domain resource, and the RA-RNTI is obtained by using the index value of the first time domain resource. Then, the CRC of the RAR is scrambled by using the obtained RA-RNTI, and the scrambled RAR is sent to the UE. The first time domain resource is a time domain resource used by the UE to send the random access preamble to the base station, and the second time domain resource is a time domain resource used by the base station to receive the random access preamble sent by the UE. The index difference is determined based on the delay of data transmission between the UE and the base station. In this way, when an RTD between the UE and the base station is greater than the duration of the single slot, the base station can obtain the RA-RNTI by using the index value of the time domain resource used by the UE to send the random access preamble to the base station, thereby ensuring that the RA-RNTI obtained by the UE is the same as the RA-RNTI obtained by the base station. In this way, the UE can successfully descramble the RAR sent by the base station, thereby ensuring random access efficiency.

Figure 6:
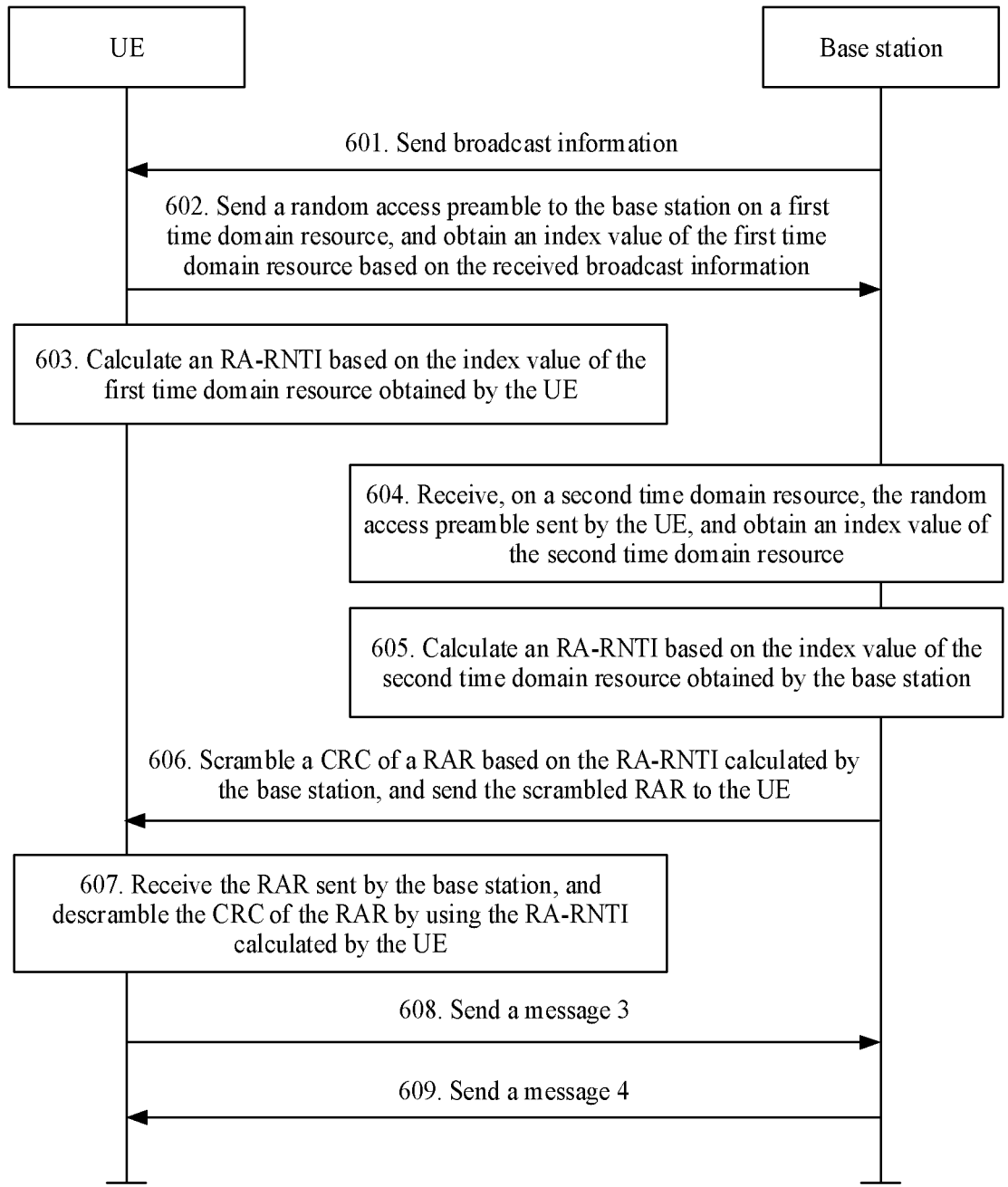
FIG. 6 is a flowchart of still another random access method according to an embodiment of this application.

FIG. 6 is a flowchart of a random access method according to an embodiment of this application. The random access method may be applied to the implementation environment shown in FIG. 2. As shown in FIG. 6, the random access method may include the following steps.

Step 601. A base station sends broadcast information to UE.

The broadcast information may carry an index value of a time domain resource used by the base station to send the broadcast information. Duration of the time domain resource is greater than or equal to an RTD between the UE and the base station. In this embodiment of this application, the time domain resource may include at least one subframe, at least one radio frame, or the like. This is not limited in this embodiment of this application.

Step 602. The UE sends a random access preamble to the base station on a first time domain resource, and obtains an index value of the first time domain resource based on the received broadcast information.

In the embodiment shown in FIG. 6, duration of the first time domain resource may be greater than or equal to the RTD between the UE and the base station. For example, the first time domain resource may include at least one subframe, at least one radio frame, or the like. This is not limited in this embodiment of this application.

In this embodiment of this application, the UE may obtain and use the index value carried in the broadcast information sent by the base station in step 601 as the index value of the first time domain resource.

Step 603. The UE calculates an RA-RNTI based on the index value of the first time domain resource.

Optionally, the UE may calculate the RA-RNTI by using an eighth formula, where the eighth formula includes:

$$RA\text{-}RNTI=1+s\_id\_UE+14\times t\_id\_new1+14\times 80\times f\_id\_UE+14\times 80\times 8\times ul\_carrier\_id\_UE,$$

where $s\_id\_UE$ is an index value of the $1^{st}$ OFDM symbol that is of a PRACH and that is used by the UE to send the random access preamble to the base station. $t\_id\_new1$ is an index value of the first time domain resource. $f\_id\_UE$ is an index value of a frequency domain in which the PRACH used by the UE to send the random access preamble to the base station is located. A value of $ul\_carrier\_id\_UE$ is 0 or 1. When an uplink carrier used by the UE to send the random access preamble to the base station is a NUL carrier, the value of $ul\_carrier\_id\_UE$ is 0. When an uplink carrier used by the UE to send the random access preamble to the base station is a SUL carrier, the value of $ul\_carrier\_id\_UE$ is 1.

Step 604. The base station receives, on a second time domain resource, the random access preamble sent by the UE, and obtains an index value of the second time domain resource.

In the embodiment shown in FIG. 6, duration of the second time domain resource is equal to duration of the first time domain resource. In other words, in the embodiment shown in FIG. 6, the duration of the second time domain resource may be greater than or equal to the RTD between the UE and the base station. For example, the second time domain resource may include at least one subframe, at least one radio frame, or the like. This is not limited in this embodiment of this application.

Step 605. The base station calculates an RA-RNTI based on the index value of the second time domain resource.

Optionally, the base station may calculate the RA-RNTI by using a ninth formula, where the ninth formula includes:

$$RA\text{-}RNTI=1+s\_id\_gNB+14\times t\_id\_new2+14\times 80\times f\_id\_gNB+14\times 80\times 8\times ul\_carrier\_id\_gNB,$$

where $s\_id\_gNB$ is an index value of the $1^{st}$ OFDM symbol that is of a PRACH and that is used by the base station to receive the random access preamble sent by the UE. $t\_id\_new2$ is an index value of the second time domain resource. $f\_id\_gNB$ is an index value of a frequency domain in which the PRACH used by the base station to receive the random access preamble sent by the UE is located. A value of $ul\_carrier\_id\_gNB$ is 0 or 1. When an uplink carrier used by the base station to receive the random access preamble sent by the UE is a NUL carrier, the value of $ul\_carrier\_id\_gNB$ is 0. When an uplink carrier used by the base station to receive the random access preamble sent by the UE is a SUL carrier, the value of $ul\_carrier\_id\_gNB$ is 1.

It should be noted that $s\_id\_UE$ in the eighth formula is equal to $s\_id\_gNB$ in the ninth formula, $f\_id\_UE$ in the eighth formula is equal to $f\_id\_gNB$ in the ninth formula, and $ul\_carrier\_id\_UE$ in the eighth formula is equal to $ul\_carrier\_id\_gNB$ in the ninth formula.

In addition, because in the embodiment shown in FIG. 6, the duration of the first time domain resource is equal to the duration of the second time domain resource, and both the first time domain resource and the second time domain resource are greater than or equal to the RTD between the base station and the UE, the time domain resource used by the base station to send the broadcast information to the UE, the first time domain resource, and the second time domain resource are a same time domain resource, that is, $t\_id\_new1$ is equal to $t\_id\_new2$. Therefore, the RA-RNTI calculated by the base station is the same as the RA-RNTI calculated by the UE.

Step 606. The base station scrambles a CRC of a RAR by using the RA-RNTI calculated by the base station, and sends the scrambled RAR to the UE.

A technical process of step 606 is similar to the technical process of step 308, and details are not described herein again in this embodiment of this application.

Step 607. The UE receives the RAR sent by the base station, and descrambles the CRC of the RAR by using the RA-RNTI calculated by the UE.

As described above, the RA-RNTI calculated by the base station is the same as the RA-RNTI calculated by the UE. Therefore, the UE may successfully descramble the RAR by using the RA-RNTI calculated by the UE.

Step 608. The UE sends a message 3 to the base station.

Step 609. The base station sends a message 4 to the UE.

Technical processes of step 608 and step 609 are similar to the technical processes of step 4 and step 5 in the foregoing random access process, and details are not described herein again in this embodiment of this application.

In conclusion, according to the random access method provided in this embodiment of this application, the UE calculates the RA-RNTI by using the index value of the first time domain resource, and the base station calculates the RA-RNTI by using the index value of the second time domain resource, where the first time domain resource is a time domain resource used by the UE to send the random access preamble to the base station, and the second time domain resource is a time domain resource used by the base station to receive the random access preamble sent by the UE. Because the duration of the first time domain resource is equal to the duration of the second time domain resource, and both the duration of the first time domain resource and the duration of the second time domain resource are greater than or equal to the RTD between the base station and the UE, the first time domain resource and the second time domain resource are a same time domain resource. Therefore, the RA-RNTIs calculated by the base station and the UE are the same. In this way, the UE can successfully descramble the RAR sent by the base station, thereby ensuring random access efficiency.

Figure 7:
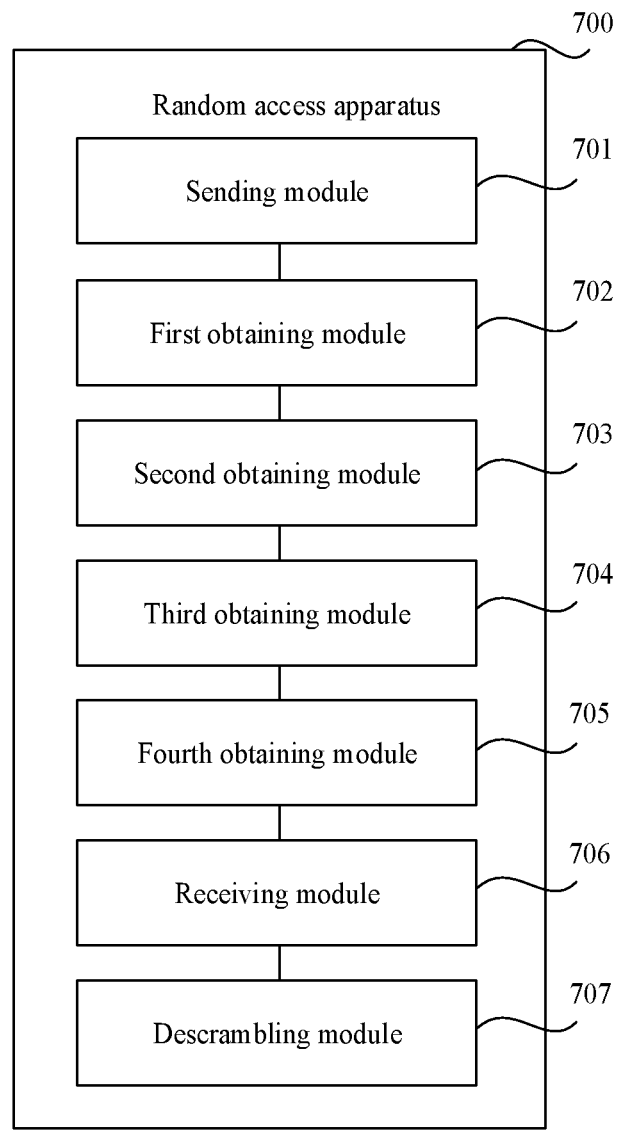
FIG. 7 is a block diagram of a random access apparatus according to an embodiment of this application.

FIG. 7 is a block diagram of a random access apparatus 700 according to an embodiment of this application. The random access apparatus 700 may be the UE in the implementation environment shown in FIG. 2. Referring to FIG. 7, the random access apparatus 700 may include a sending module 701, a first obtaining module 702, a second obtaining module 703, a third obtaining module 704, a fourth obtaining module 705, a receiving module 706, and a descrambling module 707.

The sending module 701 is configured to send a random access preamble to the base station on a first time domain resource.

The first obtaining module 702 is configured to obtain an index value of the first time domain resource.

The second obtaining module 703 is configured to obtain an index difference between the first time domain resource and the second time domain resource, where the index difference is determined based on the delay of data transmission between the UE and the base station, and the second time domain resource is a time domain resource used by the base station to receive the random access preamble sent by the UE.

The third obtaining module 704 is configured to obtain an index value of the second time domain resource by adding the index value of the first time domain resource and the index difference.

The fourth obtaining module 705 is configured to obtain an RA-RNTI based on the index value of the second time domain resource.

The receiving module 706 is configured to receive a RAR sent by the base station.

The descrambling module 707 is configured to descramble a CRC of the RAR by using the RA-RNTI.

In an embodiment of this application, the first time domain resource is the $1^{st}$ slot that is of a PRACH and that is used by the UE to send the random access preamble to the base station. The first obtaining module 702 is configured to receive broadcast information sent by the base station, where the broadcast information is used to indicate the index value of the first time domain resource.

In an embodiment of this application, the second time domain resource is the $1^{st}$ slot that is of a PRACH and that is used by the base station to receive the random access preamble sent by the UE. The second obtaining module 703 is configured to receive a first offset value sent by the base station, where the first offset value is obtained by the base station by performing a rounding operation on a quotient obtained by dividing a minimum RTD by duration of a single slot, the minimum RTD is obtained based on a shortest distance between the base station and a target cell, and the target cell is a cell in which the UE is located, and obtain the index difference based on the first offset value.

In an embodiment of this application, the descrambling module 707 is configured to, when the rounding operation is a rounding-down operation, descramble the CRC of the RAR by using a first RA-RNTI and a second RA-RNTI separately, where the first RA-RNTI is calculated based on an index value that is of the second time domain resource and that is obtained by adding a first index difference and the index value of the first time domain resource, and the second RA-RNTI is calculated based on an index value that is of the second time domain resource and that is obtained by adding a second index difference and the index value of the first time domain resource, where the first index difference is equal to the first offset value plus 1, and the second index difference is equal to the first offset value plus 2, and when the rounding operation is a rounding-up operation, descramble the CRC of the RAR by using the first RA-RNTI and a third RA-RNTI separately, where the third RA-RNTI is calculated based on an index value that is of the second time domain resource and that is obtained by adding a third index difference and the index value of the first time domain resource, where the third index difference is equal to the first offset value.

In an embodiment of this application, the second time domain resource is the $1^{st}$ slot that is of a PRACH and that is used by the base station to receive the random access preamble sent by the UE. The second obtaining module 703 is configured to receive indication information sent by the base station, where the indication information is used to indicate a rough RTD between the base station and the UE, obtain a second offset value by performing a rounding-up operation on a quotient obtained by dividing the rough RTD by duration of a single slot, and obtain the index difference based on the second offset value.

In an embodiment of this application, the descrambling module 707 is configured to descramble the CRC of the RAR by using a fourth RA-RNTI, a fifth RA-RNTI, and a sixth RA-RNTI separately, where the fourth RA-RNTI is calculated based on an index value that is of the second time domain resource and that is obtained by adding a fourth index difference and the index value of the first time domain resource, the fifth RA-RNTI is calculated based on an index value that is of the second time domain resource and that is obtained by adding a fifth index difference and the index value of the first time domain resource, and the sixth RA-RNTI is calculated based on an index value that is of the second time domain resource and that is obtained by adding a sixth index difference and the index value of the first time domain resource, where the fourth index difference is equal to the second offset value minus 1, the fifth index difference is equal to the second offset value, and the sixth index difference is equal to the second offset value plus 1.

In an embodiment of this application, the base station is an artificial satellite.

Figure 8:
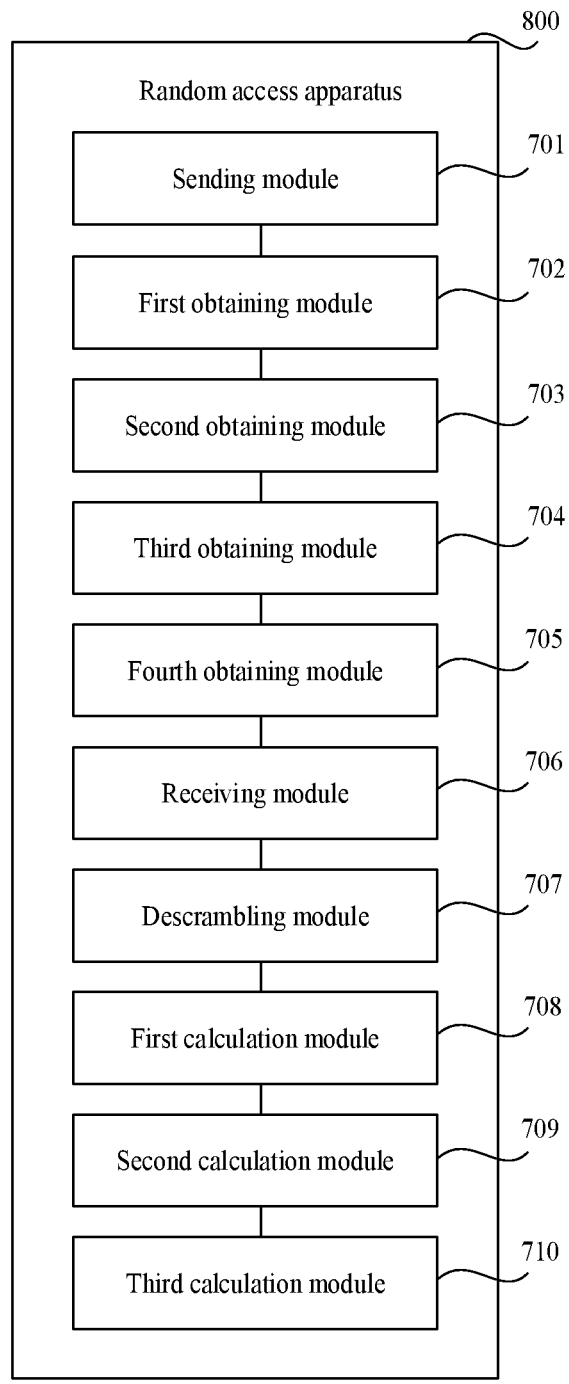
FIG. 8 is a block diagram of another random access apparatus according to an embodiment of this application.

Referring to FIG. 8, in addition to the random access apparatus 700, this embodiment of this application further provides a random access apparatus 800. In addition to the modules included in the random access apparatus 700, the random access apparatus 800 further includes a first calculation module 708, a second calculation module 709, and a third calculation module 710.

In an embodiment of this application, the RAR carries a processed TA. The first calculation module 708 is configured to, when the CRC of the RAR is successfully descrambled by using the first RA-RNTI or the third RA-RNTI, calculate, based on the processed TA by using a first formula, an unprocessed TA, where the first formula includes:

$$TA=TA_{new}+p.$$

The second calculation module 709 is configured to, when the CRC of the RAR is successfully descrambled by using the second RA-RNTI, calculate, based on the processed TA by using a second formula, an unprocessed TA, where the second formula includes:

$$TA=TA_{new}+p+1.$$

TA is the unprocessed TA, $TA_{new}$ is the processed TA, and p is the first offset value.

The third calculation module 710 is configured to, when the CRC of the RAR is successfully descrambled by using the fourth RA-RNTI, the fifth RA-RNTI, or the sixth RA-RNTI, calculate, based on the processed TA by using a third formula, an unprocessed TA, where the third formula includes:

$$TA=TA_{new}+RTD_{rough}.$$

TA is the unprocessed TA, $TA_{new}$ is the processed TA, and $RTD_{rough}$ is the rough RTD.

In conclusion, according to the random access apparatus provided in this embodiment of this application, the index value of the second time domain resource is obtained by using the index value of the first time domain resource and the index difference between the first time domain resource and the second time domain resource, and the RA-RNTI is obtained by using the index value of the second time domain resource. Then, after the RAR sent by the base station is received, the CRC of the RAR is descrambled by using the obtained RA-RNTI. The first time domain resource is a time domain resource used by the UE to send the random access preamble to the base station, and the second time domain resource is a time domain resource used by the base station to receive the random access preamble sent by the UE. The index difference is determined based on the delay of data transmission between the UE and the base station. In this way, when the RTD between the UE and the base station is greater than the duration of the single slot, the UE can obtain the RA-RNTI by using the index value of the time domain resource used by the base station to receive the random access preamble, thereby ensuring that the RA-RNTI obtained by the UE is the same as the RA-RNTI obtained by the base station. In this way, the UE can successfully descramble the RAR sent by the base station, thereby ensuring random access efficiency.

For the apparatus in the foregoing embodiment, a specific manner of executing an operation by each module is described in detail in a related method embodiment, and details are not described herein.

Figure 9:
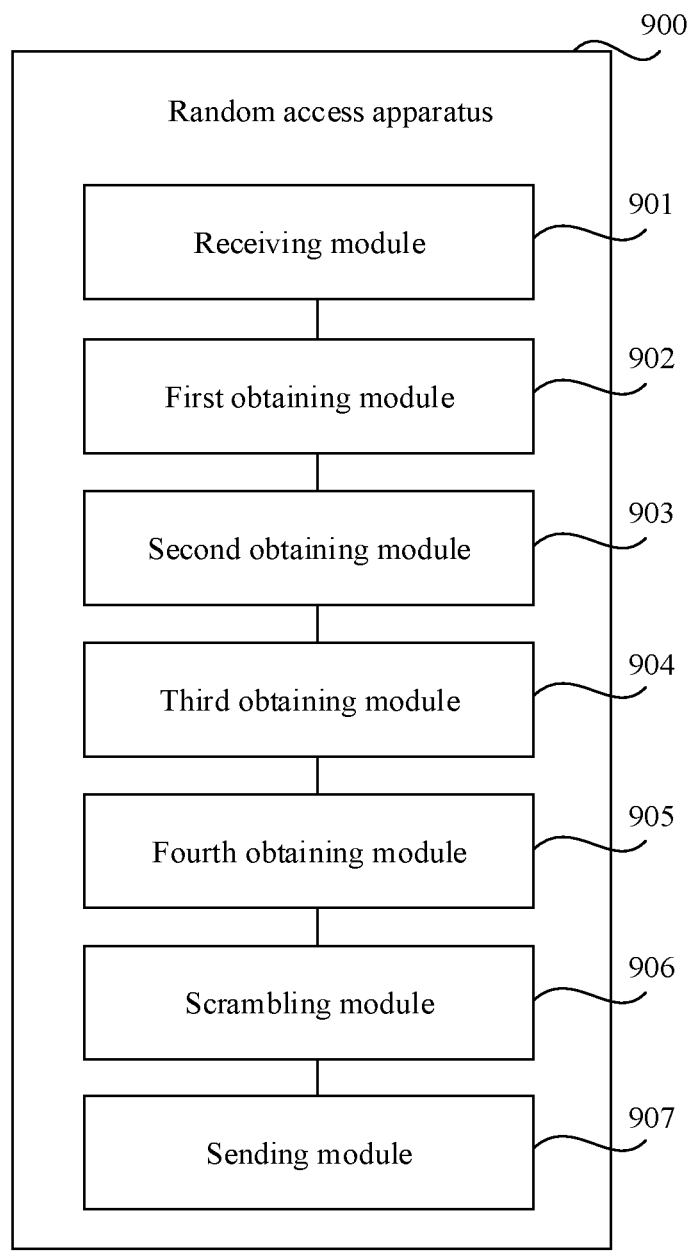
FIG. 9 is a block diagram of still another random access apparatus according to an embodiment of this application.

FIG. 9 is a block diagram of a random access apparatus 900 according to an embodiment of this application. The random access apparatus 900 may be the base station in the implementation environment shown in FIG. 2. Referring to FIG. 9, the random access apparatus 900 may include a receiving module 901, a first obtaining module 902, a second obtaining module 903, a third obtaining module 904, a fourth obtaining module 905, a scrambling module 906, and a sending module 907.

The receiving module 901 is configured to receive, on a second time domain resource, a random access preamble sent by UE.

The first obtaining module 902 is configured to obtain an index value of the second time domain resource.

The second obtaining module 903 is configured to obtain an index difference between a first time domain resource and the second time domain resource, where the index difference is determined based on the delay of data transmission between the UE and the base station, and the first time domain resource is a time domain resource used by the UE to send the random access preamble to the base station.

The third obtaining module 904 is configured to obtain an index value of the first time domain resource by subtracting the index difference from the index value of the second time domain resource.

The fourth obtaining module 905 is configured to obtain an RA-RNTI based on the index value of the first time domain resource.

The scrambling module 906 is configured to scramble a CRC of a RAR by using the RA-RNTI.

The sending module 907 is configured to send the scrambled RAR to the UE.

In an embodiment of this application, the first time domain resource is the $1^{st}$ slot that is of a PRACH and that is used by the UE to send the random access preamble to the base station, and the second time domain resource is the $1^{st}$ slot that is of a PRACH and that is used by the base station to receive the random access preamble sent by the UE. The second obtaining module 903 is configured to obtain a TA, and obtain the index difference by performing a rounding-up operation on a quotient obtained by dividing the TA by duration of a single slot.

In an embodiment of this application, the base station is an artificial satellite.

In conclusion, according to the random access apparatus provided in this embodiment of this application, the index value of the first time domain resource is obtained by using the index value of the second time domain resource and the index difference between the first time domain resource and the second time domain resource, and the RA-RNTI is obtained by using the index value of the first time domain resource. Then, the CRC of the RAR is scrambled by using the obtained RA-RNTI, and the scrambled RAR is sent to the UE. The first time domain resource is a time domain resource used by the UE to send the random access preamble to the base station, and the second time domain resource is a time domain resource used by the base station to receive the random access preamble sent by the UE. The index difference is determined based on the delay of data transmission between the UE and the base station. In this way, when an RTD between the UE and the base station is greater than the duration of the single slot, the base station can obtain the RA-RNTI by using the index value of the time domain resource used by the UE to send the random access preamble to the base station, thereby ensuring that the RA-RNTI obtained by the UE is the same as the RA-RNTI obtained by the base station. In this way, the UE can successfully descramble the RAR sent by the base station, thereby ensuring random access efficiency.

For the apparatus in the foregoing embodiment, a specific manner of executing an operation by each module is described in detail in a related method embodiment, and details are not described herein.

Figure 10:
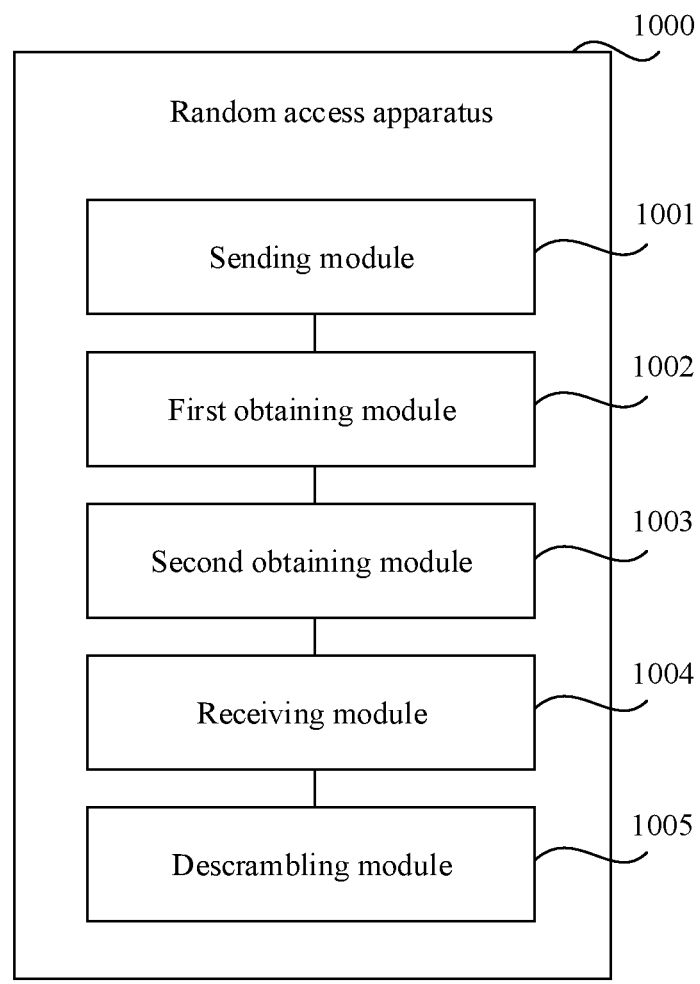
FIG. 10 is a block diagram of still another random access apparatus according to an embodiment of this application.

FIG. 10 is a block diagram of a random access apparatus 1000 according to an embodiment of this application. The random access apparatus 1000 may be the UE in the implementation environment shown in FIG. 2. Referring to FIG. 10, the random access apparatus 1000 may include a sending module 1001, a first obtaining module 1002, a second obtaining module 1003, a receiving module 1004, and a descrambling module 1005.

The sending module 1001 is configured to send a random access preamble to a base station on a first time domain resource.

The first obtaining module 1002 is configured to obtain an index value of the first time domain resource, where duration of the first time domain resource is greater than or equal to an RTD between the UE and the base station.

The second obtaining module 1003 is configured to obtain an RA-RNTI based on the index value of the first time domain resource.

The receiving module 1004 is configured to receive a RAR sent by the base station.

The descrambling module 1005 is configured to descramble a CRC of the RAR by using the RA-RNTI, where the CRC of the RAR is scrambled by the base station by using an RA-RNTI obtained based on an index value of a second time domain resource, the second time domain resource is a time domain resource used by the base station to receive the random access preamble sent by the UE, and duration of the second time domain resource is greater than or equal to the RTD between the UE and the base station.

In conclusion, according to the random access apparatus provided in this embodiment of this application, the UE calculates the RA-RNTI by using the index value of the first time domain resource, and the base station calculates the RA-RNTI by using the index value of the second time domain resource, where the first time domain resource is a time domain resource used by the UE to send the random access preamble to the base station, and the second time domain resource is the time domain resource used by the base station to receive the random access preamble sent by the UE. Because the duration of the first time domain resource is equal to the duration of the second time domain resource, and both the duration of the first time domain resource and the duration of the second time domain resource are greater than or equal to the RTD between the base station and the UE, the first time domain resource and the second time domain resource are a same time domain resource. Therefore, the RA-RNTIs calculated by the base station and the UE are the same. In this way, the UE can successfully descramble the RAR sent by the base station, thereby ensuring random access efficiency.

For the apparatus in the foregoing embodiment, a specific manner of executing an operation by each module is described in detail in a related method embodiment, and details are not described herein.

Figure 11:
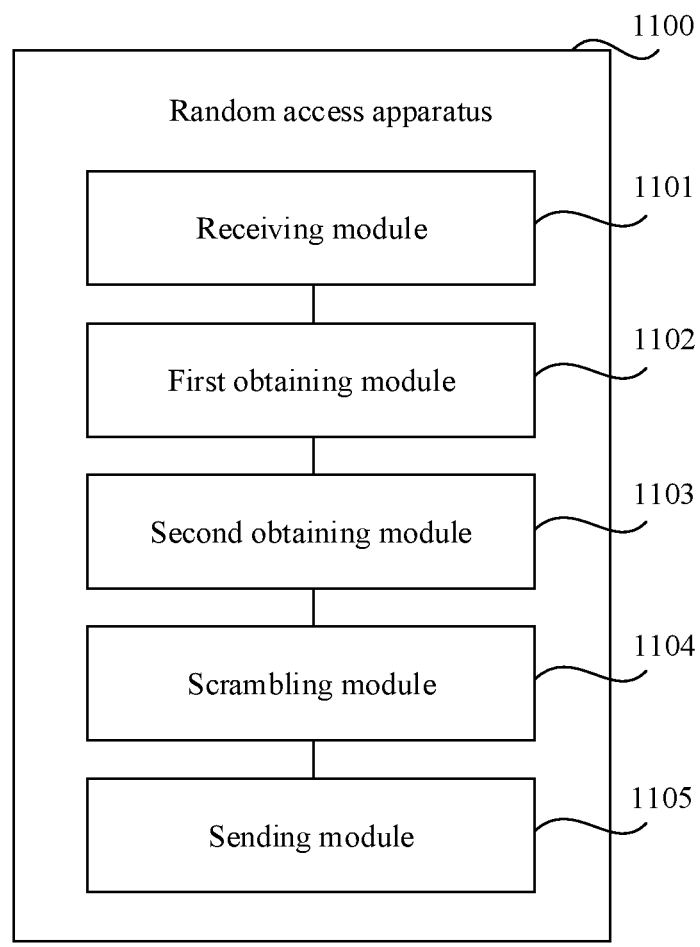
FIG. 11 is a block diagram of still another random access apparatus according to an embodiment of this application.

FIG. 11 is a block diagram of a random access apparatus 1100 according to an embodiment of this application. The random access apparatus 1100 may be the base station in the implementation environment shown in FIG. 2. Referring to FIG. 11, the random access apparatus 1100 may include a receiving module 1101, a first obtaining module 1102, a second obtaining module 1103, a scrambling module 1104, and a sending module 1105.

The receiving module 1101 is configured to receive, on a second time domain resource, a random access preamble sent by UE.

The first obtaining module 1102 is configured to obtain an index value of the second time domain resource, where duration of the second time domain resource is greater than or equal to an RTD between the UE and the base station.

The second obtaining module 1103 is configured to obtain an RA-RNTI based on the index value of the second time domain resource.

The scrambling module 1104 is configured to scramble a CRC of the RAR by using the RA-RNTI.

The sending module 1105 is configured to send the scrambled RAR to the UE, where the UE is configured to descramble the CRC of the RAR by using the RA-RNTI obtained based on an index value of a first time domain resource, the first time domain resource is a time domain resource used by the UE to send the random access preamble to the base station, and duration of the first time domain resource is greater than or equal to the RTD between the UE and the base station.

In conclusion, according to the random access apparatus provided in this embodiment of this application, the UE calculates the RA-RNTI by using the index value of the first time domain resource, and the base station calculates the RA-RNTI by using the index value of the second time domain resource, where the first time domain resource is a time domain resource used by the UE to send the random access preamble to the base station, and the second time domain resource is the time domain resource used by the base station to receive the random access preamble sent by the UE. Because the duration of the first time domain resource is equal to the duration of the second time domain resource, and both the duration of the first time domain resource and the duration of the second time domain resource are greater than or equal to the RTD between the base station and the UE, the first time domain resource and the second time domain resource are a same time domain resource. Therefore, the RA-RNTIs calculated by the base station and the UE are the same. In this way, the UE can successfully descramble the RAR sent by the base station, thereby ensuring random access efficiency.

For the apparatus in the foregoing embodiment, a specific manner of executing an operation by each module is described in detail in a related method embodiment, and details are not described herein.

Figure 12:
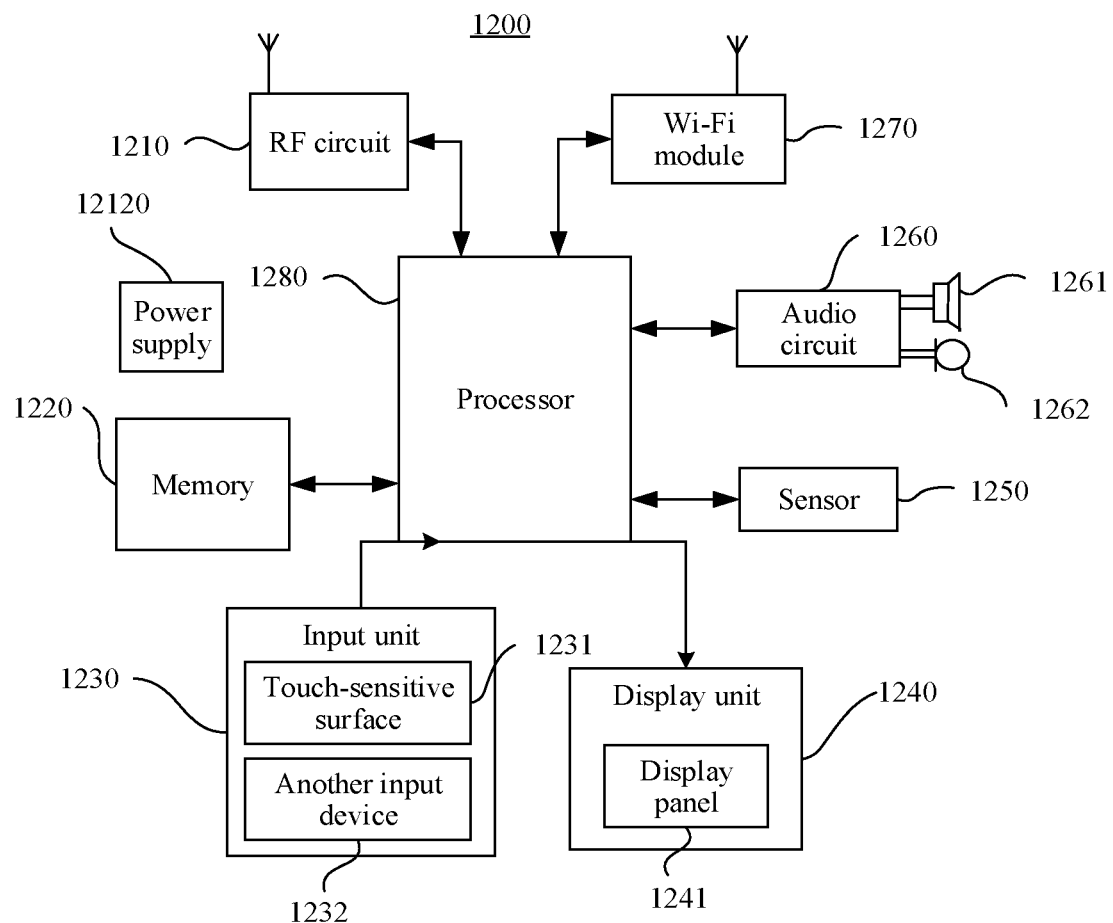
FIG. 12 is a block diagram of a communications apparatus according to an embodiment of this application.

The embodiments provide a communications apparatus. The communications apparatus may be UE (which may also be referred to as a terminal), or may be a structure such as a circuit structure, a chip, or a chip system in the UE. The embodiments provide a terminal 1200. The terminal 1200 may be the foregoing communications apparatus, and the terminal 1200 may be configured to perform a technical process performed by the UE in the random access method provided in the foregoing embodiments. Referring to FIG. 12, the terminal 1200 includes the following.

The terminal 1200 may include a radio frequency (RF) circuit 1210, a memory 1220 including one or more computer-readable storage media, an input unit 1230, a display unit 1240, a sensor 1250, an audio circuit 1260, and a WI-FI module 1270, and may include components such as a processor 1280 with one or more processing cores and a power supply 1120. It should be noted that, in some possible implementations, the memory 1220 and the processor 1280 may be integrated together. A person skilled in the art may understand that, the terminal structure shown in FIG. 12 does not constitute any limitation on the terminal, and the terminal may include more or fewer components than those shown in the figure, or combine some components, or have different component arrangements.

The RF circuit 1210 may be configured to receive and send a signal in an information receiving or sending process or a call process, and in particular, after receiving downlink information of a base station, send the downlink information to one or more processors 1280 for processing, and send related uplink data to the base station. Usually, the RF circuit 1210 includes but is not limited to an antenna, at least one amplifier, a tuner, one or more oscillators, a subscriber identity module (SIM) card, a transceiver, a coupler, a low noise amplifier (LNA), and a duplexer. In addition, the RF circuit 1210 may further communicate with a network and another device through wireless communication. Any communications standard or protocol may be used for the wireless communication, including but not limited to Global System for Mobile Communications (GSM), General Packet Radio Service (GPRS), code-division multiple access (CDMA), wideband CDMA (WCDMA), LTE, email, short message service (SMS), and the like.

The memory 1220 may be configured to store a software program and a module. The processor 1280 runs the software program and the module stored in the memory 1220, to perform various function applications and data processing. The memory 1220 may mainly include a program storage area and a data storage area. The program storage area may store an operating system, an application program required by at least one function (such as a sound play function and an image play function), and the like. The data storage area may store data (such as audio data or a phone book) created based on use of the terminal 1200, and the like. In addition, the memory 1220 may include a high-speed random-access memory (RAM), and may further include a non-volatile memory, such as at least one magnetic disk storage device, a flash storage device, or another volatile solid-state storage device. Correspondingly, the memory 1220 may further include a memory controller to provide access of the processor 1280 and the input unit 1230 to the memory 1220.

The input unit 1230 may be configured to receive input digital or character information, and produce signal input that is of a keyboard, a mouse, a joystick, optics, or a trackball and that is related to user setting and functional control. Further, the input unit 1230 may include a touch-sensitive surface 1231 and other input devices 1232. The touch-sensitive surface 1231, also referred to as a touch-screen or a touchpad, may collect a touch operation (such as an operation that a user performs on the touch-sensitive surface 1231 or near the touch-sensitive surface 1231 by using a finger, a stylus, or any other suitable object or accessory) of the user on or near the touch-sensitive surface, and drive a corresponding connection apparatus based on a preset program. Optionally, the touch-sensitive surface 1231 may include two parts a touch detection apparatus and a touch controller. The touch detection apparatus detects a touch direction of the user, detects a signal generated by the touch operation, and transmits the signal to the touch controller. The touch controller receives touch information from the touch detection apparatus, converts the touch information into touch point coordinates, and sends the touch point coordinates to the processor 1280. Moreover, the touch controller can receive and execute a command sent by the processor 1280. In addition, the touch-sensitive surface 1231 may be implemented by a resistive, capacitive, infrared, or surface acoustic touch-sensitive surface. The input unit 1230 may include the other input devices 1232 in addition to the touch-sensitive 1231. Further, the other input devices 1232 may include but is not limited to one or more of a physical keyboard, a function key (for example, a volume control key or an on/off key), a trackball, a mouse, a joystick, and the like.

The display unit 1240 may be configured to display information input by the user or information provided to the user, and various graphic user interfaces of the terminal 1200, and the graphic user interfaces may include a graphic, a text, an icon, a video, and any combination thereof. The display unit 1240 may include a display panel 1241. Optionally, the display panel 1241 may be configured in a form of a liquid-crystal display (LCD), an organic light-emitting diode (OLED), or the like. Further, the touch-sensitive surface 1231 may cover the display panel 1241. When detecting the touch operation on or near the touch-sensitive surface 1231, the touch-sensitive surface 1231 transmits the touch operation to the processor 1280 to determine a type of a touch event, and then the processor 1280 provides corresponding visual output on the display panel 1241 based on the type of the touch event. In FIG. 12, the touch-sensitive surface 1231 and the display panel 1241 are used as two separate components to implement input and output functions. However, in some embodiments, the touch-sensitive surface 1231 and the display panel 1241 may be integrated to implement the input and output functions.

The terminal 1200 may further include at least one sensor 1250, such as a light sensor, a motion sensor, and another sensor. Further, the light sensor may include an ambient light sensor and a proximity sensor. The ambient light sensor may adjust luminance of the display panel 1241 based on brightness of ambient light, and when the terminal 1200 approaches an ear, the proximity sensor may turn off the display panel 1241 and/or backlight. As one type of a motion sensor, a gravity acceleration sensor can detect a value of an acceleration in each direction (generally, three axes), can detect a value and a direction of gravity in a static mode, and can be used for an application for identifying a mobile phone gesture (such as landscape/portrait orientation switching, related games, and magnetometer gesture calibration), a function related to vibration identification (such as a pedometer and a stroke), and the like. For other sensors such as a gyroscope, a barometer, a hygrometer, a thermometer, and an infrared sensor that can be further configured on the terminal 1200, details are not described herein.

The audio circuit 1260, a speaker 1261, and a microphone 1262 may provide an audio interface between the user and the terminal 1200. The audio circuit 1260 may convert received audio data into an electrical signal and transmit the electrical signal to the speaker 1261. The speaker 1261 converts the electrical signal into a sound signal for output. In addition, the microphone 1262 converts a collected sound signal into an electrical signal. The audio circuit 1260 receives the electrical signal, converts the electrical signal into audio data, and then outputs the audio data to the processor 1280. The processor 1280 processes the audio data and then sends the processed audio data to, for example, another terminal through the RF circuit 1210, or outputs the audio data to the memory 1220 for further processing. The audio circuit 1260 may probably include an earplug jack, to provide communication between a peripheral earphone and the terminal 1200.

WI-FI is a short-range wireless transmission technology, and the terminal 1200 may help, by using the WI-FI module 1270, the user send and receive an email, browse a web page, access streaming media, and the like. The WI-FI module 1270 provides wireless broadband internet access for the user. Although FIG. 12 shows the WI-FI module 1270, it may be understood that the WI-FI module 1270 is not a necessary part of the terminal device 1200, and may be omitted based on a requirement without changing the essence of the present disclosure.

The processor 1280 is a control center of the terminal 1200, and connects all parts of the entire mobile phone by using various interfaces and lines. By running or executing a software program and/or a module stored in the memory 1220 and by invoking data stored in the memory 1220, the processor 1280 performs various functions of the terminal 1200 and processes data, to perform overall monitoring on the mobile phone. Optionally, the processor 1280 may include one or more processing cores. Preferably, an application processor and a modem processor may be integrated into the processor 1280, where the application processor mainly processes an operating system, a user interface, an application program, and the like, and the modem processor mainly processes wireless communication. It may be understood that, the modem processor may not be integrated into the processor 1280.

The terminal 1200 further includes a power supply 1120 (such as a battery) for supplying power to each component. Preferably, the power supply may be logically connected to the processor 1280 by using a power supply management system, thereby implementing functions such as charging, discharging, and power consumption management by using the power supply management system. The power supply 1120 may further include any component such as one or more direct current or alternating current power supplies, a recharging system, a power failure detection circuit, a power converter or an inverter, and a power status indicator.

Although not shown in the figure, the terminal 1200 may further include a camera, a Bluetooth module, and the like, and details are not described herein. Further, in this embodiment, the display unit of the terminal may be a touchscreen display, and the terminal further includes a memory and one or more programs, where the one or more programs are stored in the memory and are executed by one or more processors after being configured. The one or more programs include an instruction used to perform the foregoing random access method.

Figure 13:
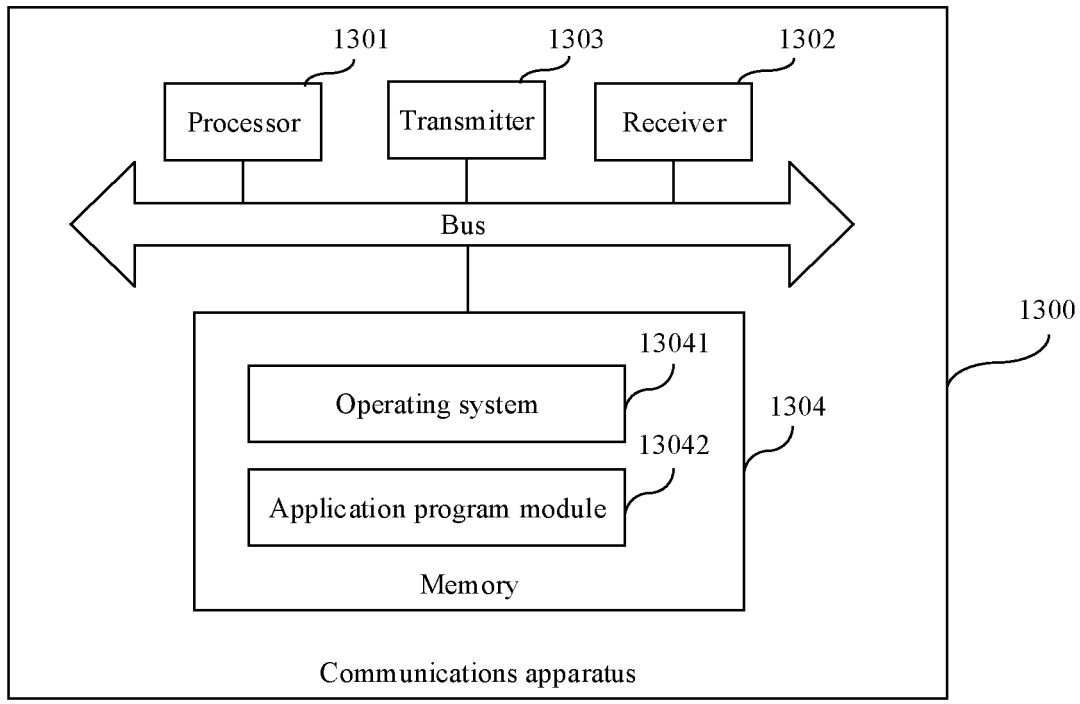
FIG. 13 is a block diagram of still another random access apparatus according to an embodiment of this application.

FIG. 13 is a block diagram of a communications apparatus 1300 according to an example embodiment. The communications apparatus may be a base station, or may be a circuit structure, a chip, a chip system, or the like in a base station. As shown in FIG. 13, the communications apparatus 1300 may include a processor 1301, a receiver 1302, a transmitter 1303, and a memory 1304. The receiver 1302, the transmitter 1303, and the memory 1304 are separately connected to the processor 1301 by using a bus. It should be noted that, in some possible implementations, the processor 1301 and the memory 1304 may be integrated together.

The processor 1301 includes one or more processing cores, and the processor 1301 runs a software program and a module to execute the method performed by the base station in the random access method provided in the embodiments of this application. The memory 1304 may be configured to store a software program and a software module. Further, the memory 1304 may store an operating system 13041 and an application program module 13042 required for at least one function. The receiver 1302 is configured to receive communications data sent by another device, and the transmitter 1303 is configured to send the communications data to the other device.

Figure 14:
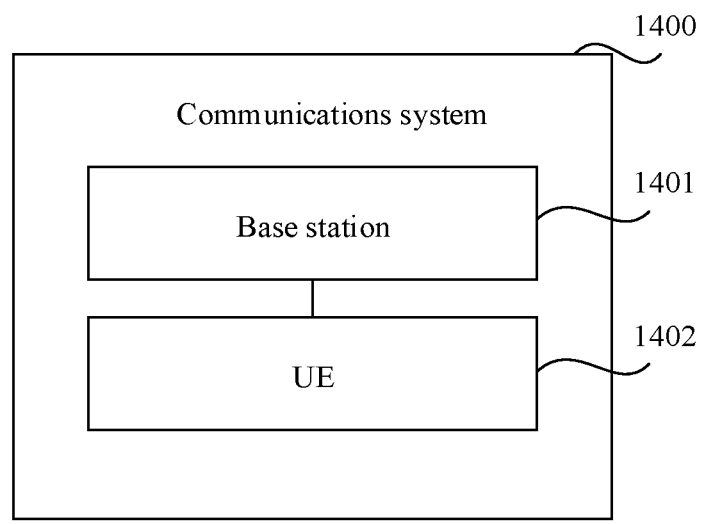
FIG. 14 is a block diagram of a communications system according to an embodiment of this application.

FIG. 14 is a block diagram of a communications system 1400 according to an example embodiment. As shown in FIG. 14, the communications system 1400 includes a base station 1401 and UE 1402.

The base station 1401 is configured to perform the random access method performed by the base station in the foregoing embodiments.

The UE 1402 is configured to perform the random access method performed by the UE in the foregoing embodiments.

In an example embodiment, a computer-readable storage medium is further provided. The computer-readable storage medium is a non-volatile computer-readable storage medium, and the computer-readable storage medium stores a computer program. When the stored computer program is executed by a processing component, the random access method provided in the foregoing embodiments of this application can be implemented.

An embodiment of this application further provides a computer program product. The computer program product stores an instruction. When the instruction is run on a computer, the computer is enabled to perform the random access method provided in the embodiments of this application.

An embodiment of this application further provides a chip. The chip includes a programmable logic circuit and/or a program instruction. When the chip runs, the random access method provided in this embodiment of this application can be performed.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

It should be understood that terms such as "first" and "second" in this specification are merely used for a purpose of distinction and description, and cannot be understood as an indication or implication of relative importance, or as an indication or implication of an order. Technical feature names with a same sequence number may correspond to different technical features.

A person of ordinary skill in the art may understand that all or some of the steps of the embodiments may be implemented by hardware or a program instructing related hardware. The program may be stored in a computer-readable storage medium, and the storage medium may include a read-only memory, a magnetic disk, a compact disc, or the like.

The foregoing descriptions are merely optional embodiments of this application, but are not used to limit this application. Any modification, equivalent replacement, or improvement made without departing from the principle of this application should fall within the protection scope of this application.

What is claimed is:

1. A method implemented by a user equipment (UE) of a wireless communications system, wherein the method comprises:
sending, on a first time domain resource, a random access preamble to a base station of the wireless communications system, wherein a round-trip delay (RTD) between the UE and the base station is greater than a duration of a single slot;
obtaining a first index value of the first time domain resource;
obtaining an index difference between the first time domain resource and a second time domain resource based on the RTD, wherein the second time domain resource is for the base station to receive the random access preamble;
obtaining a second index value of the second time domain resource by adding the first index value and the index difference;
obtaining a random access radio network temporary identifier (RA-RNTI) based on the second index value;
receiving a random access response (RAR) from the base station; and
descrambling a cyclic redundancy check (CRC) code of the RAR using the RA-RNTI.

2. The method of claim 1, wherein the first time domain resource is a first slot of a first physical random access channel (PRACH) used by the UE to send the random access preamble to the base station, and wherein obtaining the first index value comprises receiving, from the base station, broadcast information indicating the first index value.

3. The method of claim 2, wherein the second time domain resource is a first slot of a second PRACH used by the base station to receive the random access preamble from the UE, and wherein obtaining the index difference further comprises:
receiving, from the base station, a first offset value that is based on a rounding operation on a quotient of dividing a minimum RTD by the duration, wherein the minimum RTD is based on a shortest distance between the base station and a target cell, and wherein the target cell serves the UE; and
further obtaining the index difference based on the first offset value.

4. The method of claim 3, wherein descrambling the CRC code further comprises:
descrambling the CRC by separately using a first RA-RNTI and a second RA-RNTI when the rounding operation is a rounding-down operation, wherein the first RA-RNTI is based on a third index value of the second time domain resource, wherein the third index value is based on adding a first index difference and the first index value, wherein the second RA-RNTI is based on a fourth index value of the second time domain resource, wherein the third index value is based on adding a second index difference and the first index value, wherein the first index difference is equal to the first offset value plus 1, and wherein the second index difference is equal to the first offset value plus 2; and descrambling the CRC by separately using the first RA-RNTI and a third RA-RNTI when the rounding operation is a rounding-up operation, wherein the third RA-RNTI is based on a fifth index value of the second time domain resource, wherein the fifth index value is based on adding a third index difference and the first index value, and wherein the third index difference is equal to the first offset value.

5. The method of claim 4, wherein the RAR comprises a processed timing advance (TA), and wherein the method further comprises:

calculating, based on the processed TA using a first formula, an unprocessed TA when the CRC is successfully descrambled using the first RA-RNTI or the third RA-RNTI, wherein the first formula comprises:

$$TA=T_{new}+p,$$

wherein TA is the unprocessed TA, wherein $TA_{new}$ is the processed TA, and wherein p is the first offset value; and calculating, based on the processed TA using a second formula, the unprocessed TA when the CRC is successfully descrambled using the second RA-RNTI, wherein the second formula comprises:

$$TA=TA_{new}+p+1.$$

6. The method of claim 2, wherein the second time domain resource is a first slot of a second PRACH used by the base station to receive the random access preamble from the UE, and wherein obtaining the index difference further comprises:

receiving, from the base station, indication information indicating a rough RTD between the base station and the UE;

obtaining a second offset value by performing a rounding-up operation on a quotient obtained by dividing the rough RTD by the duration; and further obtaining the index difference based on the second offset value.

7. The method of claim 6, wherein descrambling the CRC code further comprises descrambling the CRC by separately using a fourth RA-RNTI, a fifth RA-RNTI, and a sixth RA-RNTI, wherein the fourth RA-RNTI is based on a sixth index value of the second time domain resource, wherein the sixth index value is obtained by adding a fourth index difference and the first index value, wherein the fifth RA-RNTI is based on a seventh index value of the second time domain resource, wherein the seventh index value is based on adding a fifth index difference and the first index value, wherein the sixth RA-RNTI is based on an eighth index value of the second time domain resource, wherein the eighth index value is based on adding a sixth index difference and the first index value, wherein the fourth index difference is equal to the second offset value minus 1, wherein the fifth index difference is equal to the second offset value, and wherein the sixth index difference is equal to the second offset value plus 1.

8. The method of claim 7, wherein the RAR comprises a processed timing advance (TA), and wherein the method further comprises calculating, based on the processed TA using a third formula, an unprocessed TA when the CRC is successfully descrambled using the fourth RA-RNTI, the fifth RA-RNTI, or the sixth RA-RNTI, wherein the third formula comprises:

$$TA=TA_{new}+RTD_{rough},$$

wherein TA is the unprocessed TA, wherein $TA_{new}$ is the processed TA, and wherein $RTD_{rough}$ is the rough RTD.

9. A method implemented by a base station of a wireless communications system, wherein the method comprises:

receiving, on a second time domain resource, a random access preamble from a user equipment (UE) of the wireless communications system, wherein a round-trip delay (RTD) between the UE and the base station is greater than a duration of a single slot;

obtaining a second index value of the second time domain resource;

obtaining an index difference between a first time domain resource and the second time domain resource based on the RTD, wherein the first time domain resource is used by the UE to send the random access preamble to the base station;

obtaining a first index value of the first time domain resource by subtracting the index difference from the second index value;

obtaining a random access radio network temporary identifier (RA-RNTI) based on the first index value; and scrambling a cyclic redundancy check (CRC) code of a random access response (RAR) using the RA-RNTI to obtain a scrambled RAR; and sending the scrambled RAR to the UE.

10. The method of claim 9, wherein the first time domain resource is a first slot of a first physical random access channel (PRACH) used by the UE to send the random access preamble to the base station, and wherein the second time domain resource is a first slot of a second PRACH used by the base station to receive the random access preamble from the UE, and wherein obtaining the index difference further comprises:

obtaining a timing advance (TA);

dividing the TA by the duration to obtain a quotient; and obtaining the index difference by performing a rounding-up operation on the quotient.

11. An apparatus comprising:

a non-transitory memory configured to store instructions; and a processor coupled to the non-transitory memory, wherein the instructions cause the processor to be configured to:

send, on a first time domain resource, a random access preamble to a base station wherein a round-trip delay (RTD) between the apparatus and the base station is greater than a duration of a single slot;

obtain a first index value of the first time domain resource;

obtain an index difference between the first time domain resource and a second time domain resource based on the RTD, wherein the second time domain resource is for the base station to receive the random access preamble;

obtain a second index value of the second time domain resource by adding the first index value and the index difference;

obtain a random access radio network temporary identifier (RA-RNTI) based on the second index value;

receive a random access response (RAR) from the base station; and descramble a cyclic redundancy check (CRC) code of the RAR using the RA-RNTI.

12. The apparatus of claim 11, wherein the first time domain resource is a first slot of a first physical random access channel (PRACH) used by the apparatus to send the random access preamble to the base station, and wherein the instructions further cause the processor to be configured to receive, from the base station, broadcast information indicating the first index value.

13. The apparatus of claim 12, wherein the second time domain resource is a first slot of a second PRACH used by the base station to receive the random access preamble, and wherein the instructions further cause the processor to be configured to:
  receive, from the base station, a first offset value based on performing a rounding operation on a quotient of dividing a minimum RTD by the duration, wherein the minimum RTD is based on a shortest distance between the base station and a target cell, and wherein the target cell serves the apparatus; and
  further obtain the index difference based on the first offset value.

14. The apparatus of claim 13, wherein the instructions further cause the processor to be configured to:
  descramble the CRC by separately using a first RA-RNTI and a second RA-RNTI when the rounding operation is a rounding-down operation, wherein the first RA-RNTI is based on a third index value of the second time domain resource, wherein the third index value is based on adding a first index difference and the first index value, wherein the second RA-RNTI is based on a fourth index value of the second time domain resource, wherein the fourth index value is based on adding a second index difference and the first index value, wherein the first index difference is equal to the first offset value plus 1, and wherein the second index difference is equal to the first offset value plus 2; and
  descramble the CRC by separately using the first RA-RNTI and a third RA-RNTI when the rounding operation is a rounding-up operation, wherein the third RA-RNTI is based on a fifth index value of the second time domain resource wherein the fifth index value is based on adding a third index difference and the first index value, wherein the third index difference is equal to the first offset value.

15. The apparatus of claim 14, wherein the RAR comprises a processed timing advance (TA), and wherein the instructions further cause the processor to be configured to:
  calculate, based on the processed TA using a first formula, an unprocessed TA when the CRC is successfully descrambled using the first RA-RNTI or the third RA-RNTI, wherein the first formula comprises:

$$TA=TA_{new}+p,$$

wherein TA is the unprocessed TA, wherein $TA_{new}$ is the processed TA, and wherein p is the first offset value; and
  calculate, based on the processed TA using a second formula, the unprocessed TA when the CRC is successfully descrambled using the second RA-RNTI, wherein the second formula comprises:

$$TA=TA_{new}+p+1.$$

16. The apparatus of claim 12, wherein the second time domain resource is a first slot of a second PRACH used by the base station to receive the random access preamble from the apparatus, and wherein the instructions further cause the processor to be configured to:
  receive, from the base station, indication information indicating a rough RTD between the base station and the apparatus;
  obtain a second offset value by performing a rounding-up operation on a quotient based on dividing the rough RTD by the duration; and
  obtain the index difference based on the second offset value.

17. The apparatus of claim 16, wherein the instructions further cause the processor to be configured to descramble the CRC by separately using a fourth RA-RNTI, a fifth RA-RNTI, and a sixth RA-RNTI, wherein the fourth RA-RNTI is based on a sixth index value of the second time domain resource wherein the sixth index value is based on adding a fourth index difference and the first index value, wherein the fifth RA-RNTI is based on a seventh index value of the second time domain resource wherein the seventh index value is based on adding a fifth index difference and the first index value, wherein the sixth RA-RNTI is based on an eighth index value of the second time domain resource wherein the eighth index value is based on adding a sixth index difference and the first index value, wherein the fourth index difference is equal to the second offset value minus 1, wherein the fifth index difference is equal to the second offset value, and wherein the sixth index difference is equal to the second offset value plus 1.

18. The apparatus of claim 17, wherein the RAR comprises a processed timing advance (TA), and wherein the instructions further cause the processor to be configured to calculate, based on the processed TA using a third formula, an unprocessed TA when the CRC is successfully descrambled using the fourth RA-RNTI, the fifth RA-RNTI, or the sixth RA-RNTI, and wherein the third formula comprises:

$$TA=TA_{new}+RTD_{rough},$$

wherein TA is the unprocessed TA, wherein $TA_{new}$ is the processed TA, and wherein $RTD_{rough}$ is the rough RTD.

19. An apparatus comprising:
  a non-transitory memory configured to store instructions; and
  a processor coupled to the non-transitory memory, wherein the instructions cause the processor to be configured to:
    receive, on a second time domain resource, a random access preamble from a user equipment (UE), wherein a round-trip delay (RTD) between the UE and the apparatus is greater than a duration of a single slot;
    obtain a second index value of the second time domain resource;
    obtain an index difference between a first time domain resource and the second time domain resource based on the RTD, wherein the first time domain resource is used by the UE to send the random access preamble to the apparatus;
    obtain a first index value of the first time domain resource by subtracting the index difference from the second index value;
    obtain a random access radio network temporary identifier (RA-RNTI) based on the first index value;
    scramble a cyclic redundancy check (CRC) code of a random access response (RAR) using the RA-RNTI to obtain a scrambled RAR; and
    send the scrambled RAR to the UE.

20. The apparatus of claim 19, wherein the first time domain resource is a first slot of a first physical random access channel (PRACH) used by the UE to send the random access preamble to the apparatus, and wherein the second time domain resource is a first slot of a second PRACH used by the apparatus to receive the random access preamble from the UE, and wherein the instructions further cause the processor to be configured to:
- obtain a timing advance (TA); and
- obtain the index difference by performing a rounding-up operation on a quotient of dividing the TA by the duration.

* * * * *

UNITED STATES PATENT AND TRADEMARK OFFICE
CERTIFICATE OF CORRECTION

PATENT NO. : 11,889,547 B2
APPLICATION NO. : 17/244487
DATED : January 30, 2024
INVENTOR(S) : Chuili Kong et al.

It is certified that error appears in the above-identified patent and that said Letters Patent is hereby corrected as shown below:

In the Claims

Claim 8, Column 34, Line 1: "wherein $TA_{new}$, is" should read "wherein $TA_{new}$ is"

Signed and Sealed this
Second Day of April, 2024

*Katherine Kelly Vidal*

Katherine Kelly Vidal
*Director of the United States Patent and Trademark Office*